United States Patent
Eder

(10) Patent No.: US 7,039,654 B1
(45) Date of Patent: May 2, 2006

(54) AUTOMATED BOT DEVELOPMENT SYSTEM

(75) Inventor: Jeff Scott Eder, Mill Creek, WA (US)

(73) Assignee: Asset Trust, Inc., Bothell, WA (US)

( * ) Notice: Subject to any disclaimer, the term of this patent is extended or adjusted under 35 U.S.C. 154(b) by 571 days.

(21) Appl. No.: 10/242,154

(22) Filed: Sep. 12, 2002

(51) Int. Cl.
*G06F 17/30* (2006.01)

(52) U.S. Cl. ............... 707/104.1; 707/100; 717/101

(58) Field of Classification Search .............. 707/100, 707/104.1, 7; 705/1; 704/4, 8, 9; 717/100–114
See application file for complete search history.

(56) References Cited

U.S. PATENT DOCUMENTS

| | | | |
|---|---|---|---|
| 6,073,115 A | | 6/2000 | Marshall .................. 705/35 |
| 6,301,584 B1 | * | 10/2001 | Ranger .................. 707/103 R |
| 6,314,555 B1 | * | 11/2001 | Ndumu et al. .............. 717/101 |

(Continued)

OTHER PUBLICATIONS

Anonymous, "Survey: Too Clever by Half", The Economist, Jan. 24, 2004.

(Continued)

*Primary Examiner*—Jean R. Homere
*Assistant Examiner*—Cheryl Lewis

(57) ABSTRACT

An automated system (100) and method for developing Complete Context™ Bots (30) for an organization. After extracting data from existing narrowly focused systems, mission measures and organization levels are defined for one or more organizations. The elements, factors and risks that contribute to mission measure performance by organization level and organization are systematically defined and stored in a ContextBase (60) using up to six context layers. ContextBase (60) information is extracted for specified combinations of context layers, organization levels and organizations as required to produce complete context frames that are used to support simulations of bot performance under a variety of scenarios. The program instructions that will maximize bot performance under the forecast scenarios are identified. After this programming is transferred to the Complete Context™ Bot (30), it is activated.

37 Claims, 21 Drawing Sheets

U.S. PATENT DOCUMENTS

| | | | |
|---|---|---|---|
| 6,801,909 B1* | 10/2004 | Delgado et al. | 707/4 |
| 6,859,523 B1* | 2/2005 | Jilk et al. | 379/32.01 |
| 2002/0035483 A1* | 3/2002 | Patel | 705/1 |
| 2003/0182391 A1* | 9/2003 | Leber et al. | 709/217 |
| 2003/0217105 A1* | 11/2003 | Zircher et al. | 709/205 |
| 2004/0205772 A1* | 10/2004 | Uszok et al. | 719/317 |

OTHER PUBLICATIONS

Barua, Anitesh; Lee, C.H. Sophie; Whinston, Andrew, "The Calculus of Reengineering", Aug. 1994.

Haesendonckx, Michael, "VBM—Value Driver Tree", Jun. 8, 2005.

Caouette, John, Altman, Edward & Narayanan, Paul, Managing Credit Risk, 1998, John Wiley and Sons.

Lohr, Steve, "Gates tries to inspire future techies", International Herald Tribune, Mar. 2, 2004.

Koller, Timothy, "What is value based management", McKinsey Quarterly, 1994, No. 3.

Brown, Carol; Coakley, James; Phillips, Mary Ellen, Neural Networks Enter World of Mgmt Accounting.

Bielinski, Daniel, "How to sort out the premium drivers of post deal value", Mergers & Acquisitions.

Bergstrom, Peter; Kimber Eliot, "Formal data models for SGML and HyTime", SGML, Mar. 1999, electrum.

Harold, Elliotte, XML Bible, IDG Books, 1999.

Knight, James, Value Based Management, McGraw Hill, 1998.

NeuroSolutions, Application Summaries, 1995.

Brown, Carolyn, Phillips, Mary Ellen, Expert Systems for Management Accounting Tasks, IMA Foundation.

* cited by examiner

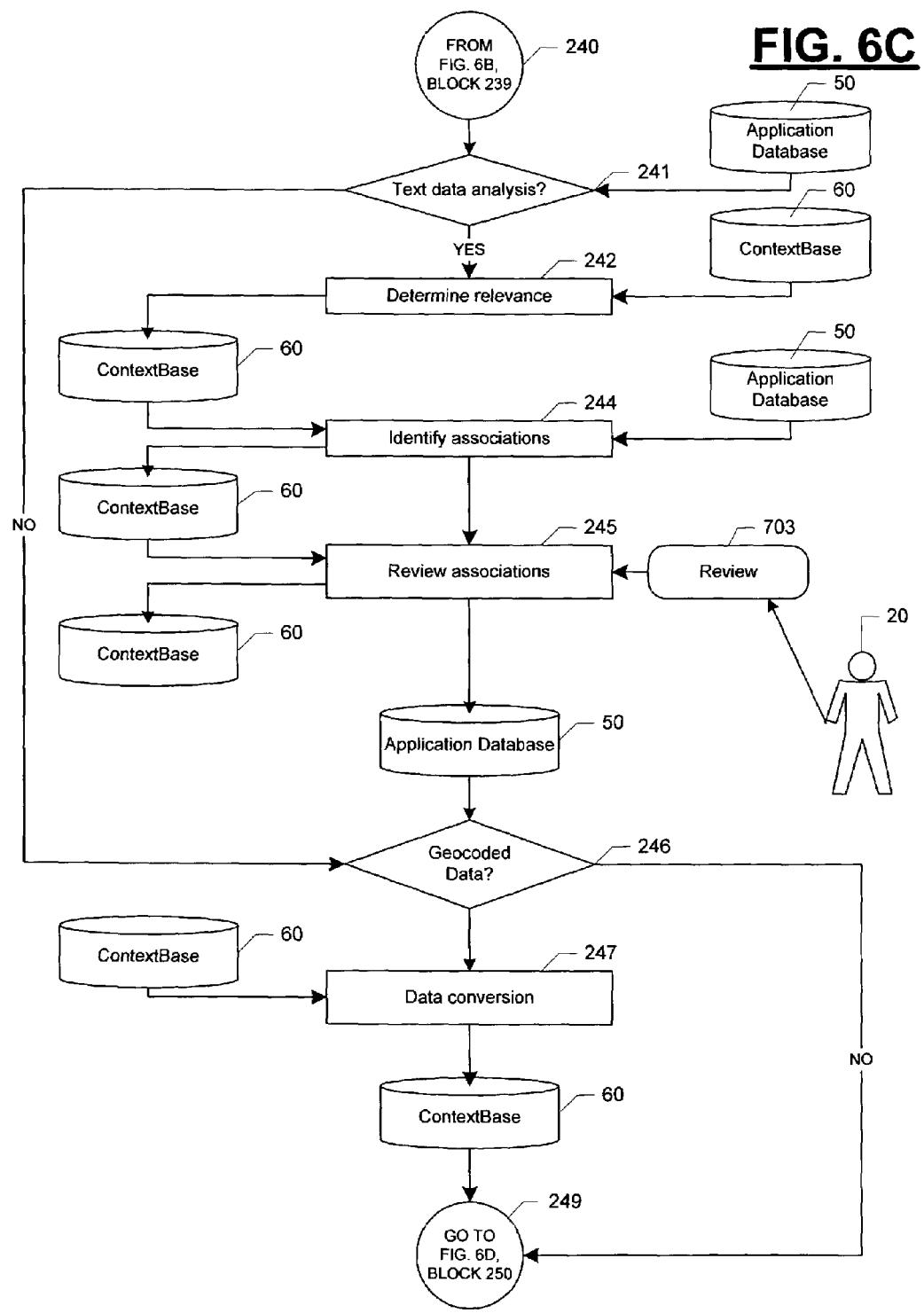

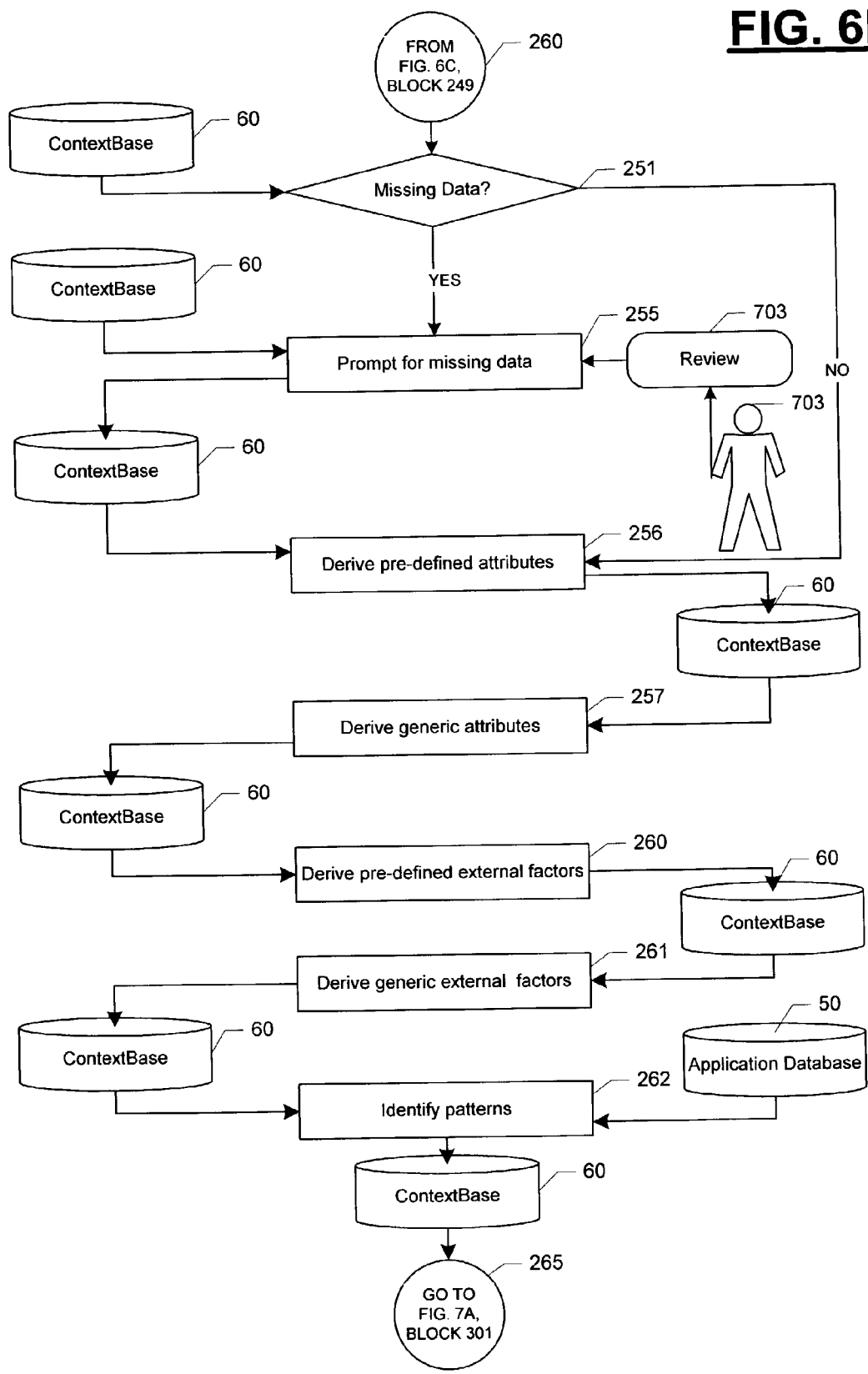

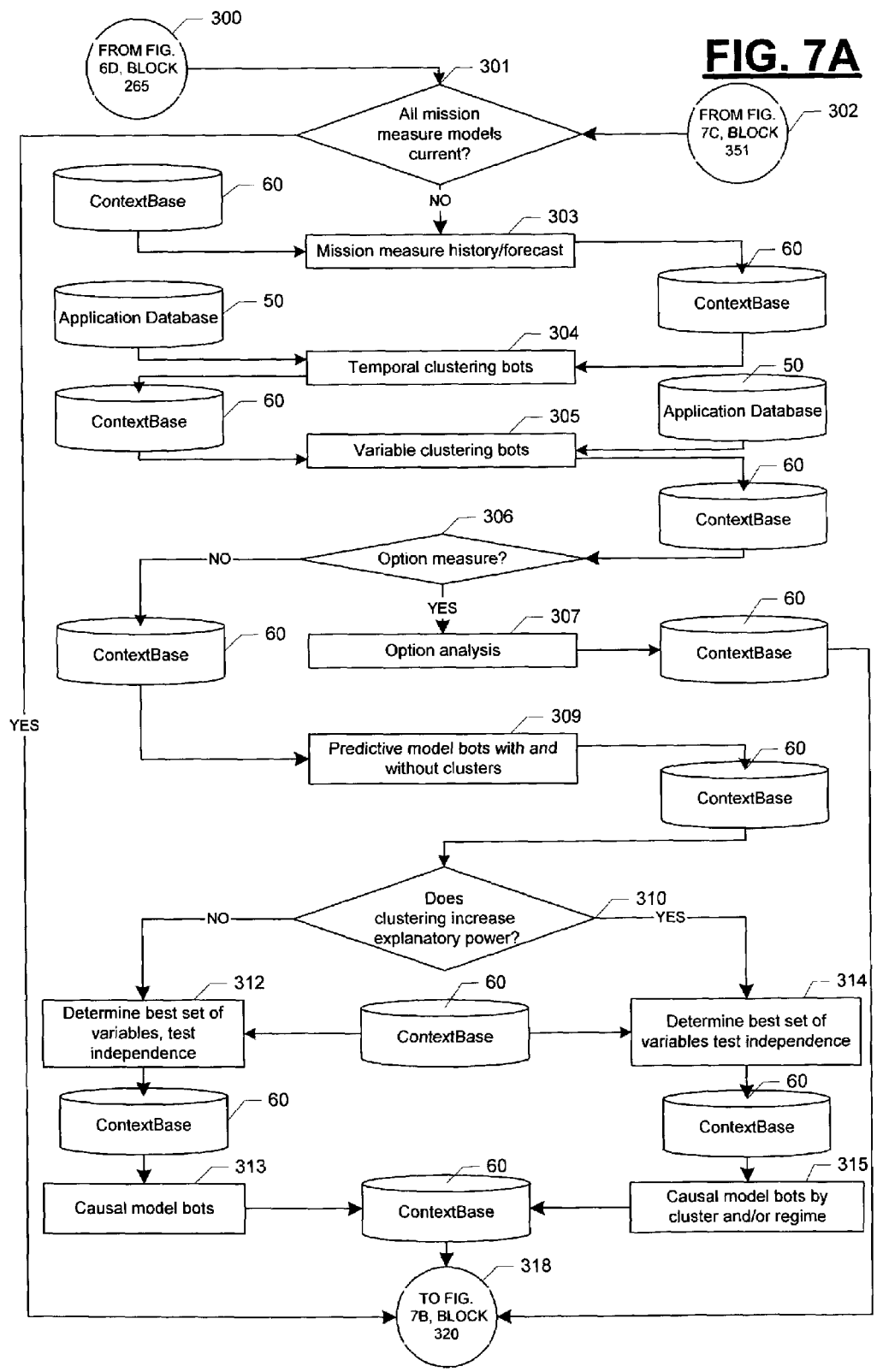

AUTOMATED BOT DEVELOPMENT SYSTEM

CROSS REFERENCE TO RELATED APPLICATIONS

The subject matter of this application is related to the subject matter of: U.S. patent application Ser. No. 10/237,021 filed Sep. 9, 2002. U.S. patent application Ser. No. 10/071,164 filed Feb. 7, 2002, U.S. patent application Ser. No. 10/717,026 filed Nov. 19, 2003, U.S. patent application Ser. No. 11/094,171 filed Mar. 31, 2005, U.S. patent application Ser. No. 10/746,673 filed Dec. 24, 2003. U.S. patent application Ser. No. 11/167,685 filed Jun. 27, 2005, U.S. patent application Ser. No. 11/262,146 filed Oct. 28, 2005 and U.S. patent application Ser. No. 11/268,081 filed Nov. 7, 2005.

BACKGROUND OF THE INVENTION

This invention relates to a computer based method of and system for developing Complete Context™ Bots.

The last few years have produced many marvelous advances in information technology and a number of well publicized disappointments including the demise of many "dot-com" companies and the implosion of many of the high technology communication firms. A major disappointment that has received relatively little attention has been the failure of agents or bots become fully established as useful products for both consumers and businesses. Bots and agents (hereinafter, referred to as bots) are software components that perform tasks in an automated fashion. They can work independently or as part of a larger application. In the consumer market, many expected bots to take over the responsibility for most day-to-day purchasing activity by constantly scouring the world wide web to locate the best prices, complete purchases and arrange for just-in-time delivery. These same people expected bots to perform similar functions in automating purchasing and logistics management for businesses. Others expected bots to automate customer service and tech support. Without exception, bots have failed to make significant inroads in all of these areas. This failure mirrors the similar failure of robots (robots will also be considered bots in this application) to take over major portions of manufacturing as they were widely expected to do in the latter part of the last century. Understanding the reasons for these inter-related failures requires a little more background regarding how bots are currently programmed and used.

Bots are generally programmed to complete two different types of tasks: simple tasks that need to be constantly repeated and relatively complex tasks that require "analysis", "intelligence" or "decision making" before being implemented. Bots that perform simple tasks (using our expanded definition of bots) include simple pick and place robots that perform repetitive functions in a factory. In the Internet environment the most prevalent simple bot is the spider or web crawler that search engines use to keep their web site databases current.

The bots that perform more complicated tasks are those that respond to different inputs and recommend actions, report status and/or complete specific functions. These bots function by responding to specific stimuli or events from the external environment in accordance with pre-programmed instructions. Because these bots sort through a number of choices the information technology industry generally refers to bots of this type as "intelligent". Examples of bots that have been labeled "intelligent" by their developers include news bots that constantly monitor online news and identify interesting pieces of information for closer inspection. Examples of news bots include BusinessVue and StockVue. These bots are only slightly more sophisticated than the simple bots we described previously.

More sophisticated, "intelligent" bots can be used to sort through various prices for goods that a user wants to purchase. In a manufacturing environment, "intelligent" robots include pick and place robots that understand what to do when the part they are supposed to "pick" is not found and process control bots that can change process operating parameters to improve results. Another type of bot that has recently appeared is the swarm or adaptive bots that develop numerous strategies, use a number of bots to implement or test the different strategies, evaluate their collective performance and modify the strategy mix to favor the more successful strategies before repeating the cycle. This adaptive behavior can be supplemented by active searches of the world wide web to locate the most current versions of information and data that are thought to be relevant. In all of these cases and all known cases, these sophisticated bots are used to implement or recommend strategies that optimize short term results given the information they have regarding the physical situation, the administrative situation (aka tactical situation) and the portion of the external environment they are programmed to evaluate.

In taking this approach, the currently available bots have three key deficiencies. The first deficiency of all known bots is that they ignore several key factors that would be required to truly optimize short term results. Short term factors ignored by all known bots include:

1) the impact of their decisions/recommendations on intangible elements of performance;
2) the impact of their decisions/recommendations on relative levels of performance risk; and
3) the impact of their decisions/recommendations on other parts of the organization that are not directly affected by the decision/recommendation.

In many cases these deficiencies in bot background data are a product of the limitations of the narrowly focused management systems (hereinafter, narrow systems) like customer relationship management and supply chain management systems that most organizations use to manage their day to day operations.

The second deficiency of currently available bots is that they fail to strike a balance between optimizing short term impact and long term performance. As Jack Welch, the retired CEO of General Electric said "any fool can optimize short term results and any fool can optimize long term results. The real trick is striking a balance between the two." The third deficiency of all known bots is that they do not have the ability to identify new information that is relevant to the decisions/recommendations being made. Said another way, these bots can optimize their decisions and/or recommendations within the box that has been defined by the user but they cannot change the box as required to improve the value of the decisions/recommendations being made.

The shortcomings of existing bots can be summarized by saying that bots do not have the complete context required to optimize short term results, they do not have the complete context required to balance short term results against long term performance and they do not have the ability to independently define the complete context that should guide their performance.

It is clear from the preceding discussion that bots need to have the ability to define, obtain and process complete context information if they are ever to achieve the level of market acceptance that has been widely expected for over twenty years (again, using our expanded definition of bots that includes robots).

A critical first step in defining a new approach to solving the problem of "getting the complete context to the right bot" is to clearly define the terms: data, information, context and knowledge. Data is anything that is recorded. This includes records saved in a digital format and data stored using other means. A subset of the digital data is structured data such as transaction data and data stored in a database for automated retrieval. Data that is not structured is unstructured data. Unstructured data includes data stored in a digital format and data stored in some other format (i.e. paper, microfilm, etc.). Information is data plus context of unknown completeness. Knowledge is data plus complete context. Complete context is defined as: all the information relevant to the decision being made using the data at a specific time. If a decision maker has data and the complete context, then providing additional data or information that is available at the time the decision is being made will not change the decision that was made. If additional data or information changes the decision, then the decision maker had "partial context".

We will use an example to illustrate the difference between data, partial context, complete context and knowledge. The example is shown in Table 1.

TABLE 1

Data: We received a check for $6,000 from Acme Tool today.
Partial Context: Acme Tool owed our division $36,000 and promised to pay the entire balance due last week. We are due to ship them another 100 widgets next Tuesday, since we have only 50 in the warehouse we need to start production by Friday if we are going to meet the promised date.
Decision based on data + partial context: Stop production and have customer service put a credit hold flag on their account, then have someone call them to find out what their problem is.
Complete context: Acme Tool owed our division $36,000 and promised to pay the entire balance due last week. We are due to ship them another 100 widgets next Tuesday, since we have only 50 in the warehouse we need to start production by Friday if we are going to meet the promised date. Acme is a key supplier for Project X in the international division. The international division owes Acme over $75,000. They expected to pay Acme last week but they are late in paying because they have had some problems with their new e.r.p. system. Netting it all out, our organization actually owes Acme $45,000. We have also learned that our biggest competitor has been trying to get Acme to support their efforts to develop a product like Project X.
Decision based on knowledge (data + complete context): See if there is anything you can do to expedite the widget shipment. Call Acme, thank them for the payment and see if they are OK with us deducting the money they owe us from the money the materials division owes them. If Acme OKs it, then call the international division and ask them to do the paperwork to transfer the money to us so we can close this out.

The example in Table 1 illustrates that there is a clear difference between having data with partial context and having knowledge. Data with partial context leads to one decision while data with complete context creates knowledge and leads to another completely different decision. The example also reinforces the prior discussion regarding the reasons that so many firms are not realizing the return they expect from their investments in bots. Virtually every bot development system being sold today processes and analyzes data within the narrow silo defined by the portion of the organization it supports. As a result, these systems can not provide bots with the complete context required to turn data into knowledge.

Another limitation of all known bot development systems is their complete reliance on structured historical data. The problem with this is that not all data are stored and that most of the data that is stored is stored in an unstructured format that is difficult to process. The most common estimate is that 80% of the data that is stored digitally is stored in an unstructured format. A number of products are being developed to help structure unstructured digital data. The system of the present invention is capable of accepting input from these systems. The system of the present invention also has the ability to structure and process unstructured: text data, video data, geo-coded data and web data on its own. This leaves the problem of data that has not been stored in any system as an area needing further development. While much of the data that has not been stored may not be useful for performance management and bot development, the data that resides with subject-matter experts is potentially very valuable. In fact, as the world moves into an increasingly uncertain environment with a growing number of non-traditional threats and increasingly volatile weather patterns, the need to rely on information from subject-matter experts is expected to increase dramatically.

A method for systematically incorporating data from subject-matter experts into bot development systems is clearly needed. However, to be successful, this method needs to overcome a few potential problems. While subject-matter experts have a great deal of knowledge about a particular field, it is more likely than not that:
 1. they do not have any expertise in knowledge representation, and
 2. they do not have any expertise in probability theory.

As a result, the subject-matter experts may have difficulty communicating their expertise in a manner that can be readily processed by a data fusion analysis. While overcoming both problems is important, solving the second problem is particularly important because subject-matter experts involvement is most likely to be critical in developing assessments for the increasing number of situations that have little or no precedent, very limited data and a consequent high degree of uncertainty.

In light of the preceding discussion, it is clear that it would be desirable to develop methods and systems that could define the complete context required for effectively and efficiently programming bots. In short, the new methods and systems should help organizations improve their performance by developing, storing, retrieving and applying complete context information for use in developing sophisticated bots to complete tasks and develop recommendations in an automated fashion.

SUMMARY OF THE INVENTION

It is a general object of the present invention to provide a novel, useful system that develops, analyzes, stores and applies complete context information for use in developing robust, productive bots in an automated fashion. This new system overcomes the limitations and drawbacks of the prior art that were described previously.

Processing in the automated bot development system (100) is completed in three steps: The first step in the novel method for bot development involves using data provided by existing narrow systems and the nine key terms described previously to define mission measures for each organization level the bots will be supporting. As part of this processing data from the world wide web, unstructured data, geo-coded data, and video data are processed and made available for analysis. The automated indexation, extraction, aggregation and analysis of data from the existing, narrow computer-based systems significantly increases the scale and scope of the tasks that can be completed by the bots. This innovation also promises to significantly extend the life of the narrow systems that would otherwise become obsolete. The system of the present invention is capable of processing data from the "narrow" systems listed in Table 2.

TABLE 2

| | |
|---|---|
| 1. | Accounting systems; |
| 2. | Alliance management systems; |
| 3. | Asset management systems; |
| 4. | Brand management systems; |
| 5. | Budgeting/financial planning systems; |
| 6. | Business intelligence systems; |
| 7. | Call management systems; |
| 8. | Cash management systems; |
| 9. | Channel management systems; |
| 10. | Commodity risk management systems; |
| 11. | Content management systems; |
| 12. | Contract management systems; |
| 13. | Credit-risk management system |
| 14. | Customer relationship management systems; |
| 15. | Data integration systems; |
| 16. | Demand chain systems; |
| 17. | Decision support systems; |
| 18. | Document management systems; |
| 19. | Email management systems; |
| 20. | Employee relationship management systems; |
| 21. | Energy risk management systems; |
| 22. | Executive dashboard systems; |
| 23. | Expense report processing systems; |
| 24. | Fleet management systems; |
| 25. | Fraud management systems; |
| 26. | Freight management systems; |
| 27. | Human capital management systems; |
| 28. | Human resource management systems; |
| 29. | Incentive management systems; |
| 30. | Innovation management systems; |
| 31. | Insurance management systems; |
| 32. | Intellectual property management systems; |
| 33. | Intelligent storage systems |
| 34. | Interest rate risk management systems; |
| 35. | Investor relationship management systems; |
| 36. | Knowledge management systems; |
| 37. | Learning management systems; |
| 38. | Location management systems; |
| 39. | Maintenance management systems; |
| 40. | Material requirement planning systems; |
| 41. | Metrics creation system |
| 42. | Online analytical processing systems; |
| 43. | Ontology management systems; |
| 44. | Partner relationship management systems; |
| 45. | Payroll systems; |
| 46. | Performance management systems; (for IT assets) |
| 47. | Price optimization systems; |
| 48. | Private exchanges |
| 49. | Process management systems; |
| 50. | Product life-cycle management systems; |
| 51. | Project management systems; |
| 52. | Project portfolio management systems; |
| 53. | Revenue management systems; |
| 54. | Risk management information system |
| 55. | Risk simulation systems; |
| 56. | Sales force automation systems; |
| 57. | Scorecard systems; |
| 58. | Sensor grid systems; |
| 59. | Service management systems; |
| 60. | Six-sigma quality management systems; |
| 61. | Strategic planning systems; |
| 62. | Supply chain systems; |
| 63. | Supplier relationship management systems; |
| 64. | Support chain systems; |
| 65. | Taxonomy development systems; |
| 66. | Technology chain systems; |
| 67. | Unstructured data management systems; |
| 68. | Visitor (web site) relationship management systems; |
| 69. | Weather risk management systems; |

TABLE 2-continued

| | |
|---|---|
| 70. | Workforce management systems; and |
| 71. | Yield management systems |

The extracted narrow system information is identified separately for each of the different subsets of the organization. Unstructured data is also captured for processing and later use in the automated bot development system (100) as part of this process. For simplicity, we will refer to the collection of different subsets of an organization that can be supported by the system for automated bot development as organization levels.

Managers use the extracted narrow system data to define quantitative mission measures for each organization level as part of the first step of processing. The quantitative mission measures that are initially created using the extracted narrow system data from each organization can take any form. For many of the lower organization levels (combinations being the highest level and an element being the lowest organization level) the mission measures are simple statistics like percentage achieving a certain score, average time to completion and the ratio of successful applicants versus failures. At higher levels more complicated mission measures are generally used. For example, Table 4 shows a three part mission measure for a medical organization mission—patient health, patient longevity and financial break even. The system of the present invention provides several other important features, including:

1. the user is free to specify more than one mission measure for every organization level; and
2. the user can assign a weighting to each of the different mission measures which is different than the risk adjusted value measure.

After the user defines the mission measures and the data available for processing is identified, processing advances to second stage of processing where mission-oriented context layers for each organization level are developed and stored in a ContextBase (60). In the final processing step the context layers and organization levels are combined as required to develop context frames. The context frames are used to drive simulations that identify the program parameters that will maximize mission measure performance.

The system of the present invention is the first known system with the ability to systematically develop the context required to support the comprehensive analysis of mission performance and turn data into knowledge. Before completing the summary of system processing, we will provide more background regarding complete context, context layers and the ContextBase (60).

The complete context for evaluating and optimizing performance can contain up to six distinct types of information:

1. Information that defines the physical context, i.e. we have 50 good widgets in the warehouse available for shipment. If we need to make more, we need to use the automated lathe and we need to start production 2 days before we need to ship;
2. Information that defines the tactical (aka administrative) context, i.e. we need to ship 100 widgets to Acme by Tuesday;
3. Information that defines the instant impact, i.e. Acme owes us $30,000 and the price per widget is $100 and the cost of manufacturing widgets is $80 so we make $20 profit per unit (for most businesses this could be defined as the short term economic context).

4. Information that defines the organizational context, i.e. Acme is also a key supplier for the new product line, Project X, that is expected to double our revenue over the next five years;
5. Information that defines the mission impact, i.e. Acme is one of our most valuable customers and they are a key supplier to the international division, and
6. Information that defines the social environment, i.e. our biggest competitor is trying to form a relationship with Acme.

We will refer to each different type of information as a context layer. Different combinations of context layers from different organization levels and/or organizations are relevant to different tasks being supported by bots. Each different combination of context layers, organization levels and organizations is called a context frame.

The ability to rapidly create context frames can be used to analyze a number of different operating scenarios including an alliance with another organization or a joint exercise between two organizations. For example, combined context frames could be created to support Company A and the Company B in analyzing the short and long term implications of a joint exercise as shown in Table 3. It is worth noting at this point that the development of a combination frame is most effective when the two organizations share the same mission measures.

TABLE 3

| Context Frame Description | Combines These Layers | From These Organizations |
| --- | --- | --- |
| JV short term | Physical, Tactical & Instant | Company A and Company B |
| JV strategic | Physical, Tactical, Instant, Organization, Mission & Social Environment | Company A and Company B |

Using the context frames from the combined organizations to guide both tactical (short-term) and strategic analysis and decision making would allow each organization to develop plans for achieving a common goal from the same perspective (or context) while still maintaining independence.

This capability provides two distinct advantages over traditional bot development applications that:
1. do not have the ability to combine organizational perspectives in an automated fashion; and
2. only consider the first three layers of context when specifying program instructions.

Because traditional bots ignore organization, mission and environmental contexts (and some aspects of instant impact), the recommendations they make and the actions they complete are often at odds with common sense decisions made by line managers that have a more complete context for evaluating the same data. This deficiency is the primary reasons that bots have not attained the level of acceptance that many have forecast for them—they do not analyze the complete context required to make a knowledgeable decision. This deficiency is closely related to a similar deficiency in business intelligence applications that leads many to conclude that "there is no intelligence in business intelligence applications".

Before moving on to better define context, it is important to re-emphasize the fact that the six layers of context we have defined can be used to support the development of bots that will support management and analysis in a wide variety of fields. In fact, the system of the present invention will support the development of Complete Context™ Bots (30) for any organization with a quantifiable mission. For example, Table 4 illustrates the use of the six layers in analyzing a sample business context and a sample medical context.

TABLE 4

| Business (shareholder value maximization mission) | Medical (patient health & longevity, financial break even missions) |
| --- | --- |
| Social Environment: competitor is trying to form a relationship with Acme | Social Environment: malpractice insurance is increasingly costly |
| Mission: Acme is a valuable customer and a key supplier, relationship damage will decrease returns and increase risk | Mission: treatment in first week improves 5 year survival 18%, 5 year reoccurrence rate is 7% higher for procedure A |
| Organization: Acme supports project X in international division | Organization: Dr. X has a commitment to assist on another procedure Monday |
| Instant: we will receive $20 profit per unit | Instant: survival rate is 99% for procedure A and 98% for procedure B |
| Tactical: need 100 widgets by Tuesday for Acme, need to start production Friday | Tactical: patient should be treated next week, his insurance will cover operation |
| Physical: 50 widgets in inventory, automated lathe is available Friday | Physical: operating room A has the right equipment and is available Monday, Dr. X could be available Monday |

Our next step in completing the background information is to define each context layer in more detail. Before we can do this we need to define nine key terms: mission, element, resource, asset, agent, action, commitment, priority and factor, that we will use in the defining the layers.
1. Mission—purpose of organization translated into one or more mission measures—examples: market value, patient survival rate, and production efficiency;
2. Element—something of value (note value may be negative) that is related to an organization—examples: property, relationships and knowledge;
3. Resource—subset of elements that are routinely transferred to others and/or consumed—examples: raw materials, products, employee time and risks;
4. Asset—subset of elements that support the consumption, production or transfer of resources. They are generally not transferred to others and/or consumed—examples: brands, customer relationships; and equipment;
5. Agent—subset of elements that can participate in an action—examples: customers, suppliers, salespeople.
6. Action—consumption, production, acquisition or transfer of resources that support organization mission—examples: sale of products and development of a new product (actions are a subset of events which include anything that is recorded);
7. Commitment—an obligation to perform an action in the future—example: contract for future sale of products;
8. Priority—relative importance assigned to actions and mission measures; and
9. Factor—conditions external to organization that have an impact on organization performance—examples: commodity prices, weather, earnings expectation.

In some cases agent, element and/or action classes may be defined by an industry organization. If this is the case, then the pre-defined classes are used as a starting point for key term definition. In any event, we will use the nine key terms to define the six context layers shown below.

1. Physical context—information about the physical status, location and performance characteristics of elements;
2. Tactical context—information about completed actions, action procedures, action priorities, commitments and events;
3. Instant context—information about the short-term impact of actions, the short term impact of events and the expected impact of commitments;
4. Organization context—information about the inter-relationship between factors, elements and/or actions (includes process maps and may be action specific);
5. Mission context—information about the impact of elements, factors and actions on mission measures (may be agent specific) and mission measure priorities; and
6. Social Environment context—information about factors in the social environment in which the organization is completing actions.

Context layers are developed by organization level for each mission measure that has been defined by the manager (21). Because mission measures are used to define each set of context layers the ContextBase(60) is said to have a "mission-centric" focus. Other features of the system of the present invention include the ability to establish alert levels for data within each layer. Management control is generally defined and applied at the tactical and mission levels by assigning priorities to actions and mission measures. Using this approach the system of the present invention has the ability to program Complete Context™ Bots (30) to analyze and optimize performance using management priorities, historical measures or some combination of the two. It is worth noting at this point that the different context layers may be combined for ease of use, to facilitate processing or as organizational requirements dictate. It is also possible to obtain the six types of required data without creating a virtual database or a physical database containing the six context layers. We will refer to the first three layers (physical, tactical and instant) as the administrative layers, the last three layers (organization, mission and social environment) as the strategic layers (aka strategic business context layers) and we will refer to any bot that can process data from all six layers as a Complete Context™ Bot.

The automated bot development system (100) develops a complete picture of how the organization is performing, saves it in the ContextBase (60), divides the picture into frames and then re-combines the frames as required to provide the detailed information regarding the slice of the organization being supported by a given bot. These details are included in the context frames that are produced using information in the ContextBase (60). The context frames are then used in simulations that define the program instructions that will be given to each bot. Developing the complete picture first, before dividing it and recombining it as required to produce context frames, enables the system of the present invention to reduce IT infrastructure complexity by an order of magnitude while dramatically increasing the ability of develop robust, productive bots. Because the ContextBase (60) is continually updated by a "learning system", changes in organization context are automatically captured and incorporated into the processing and analysis completed by the automated bot development system (100).

The mission-centric focus of the ContextBase (60) provides four other important benefits. First, by directly supporting mission success the system of the present invention guarantees that the ContextBase (60) will provide a tangible benefit to the organization. Second, the mission focus allows the system to partition the search space into two areas with different levels of processing. Data that is known to be relevant to the mission and data that is not thought to be relevant to mission. The system does not ignore data that is not known to be relevant, however, it is processed less intensely. Third, the processing completed in ContextBase (60) development defines a complete ontology for the organization. As detailed later, this ontology can be flexibly matched with other ontologies as required to interact with other bots from organizations that have organized their information using a different ontology. It also gives the bots the ability to extract data from the semantic web in an automated fashion. Finally, the focus on mission also ensures the longevity bots developed using the context stored in the ContextBase (60) as organization missions rarely change. For example, the primary mission of each branch of the military has changed very little over the last 100 years while the assets, agents, resources and the social environment surrounding that mission have obviously changed a great deal. The same can be said for almost every corporation of any size as almost all of them have a shareholder value maximization mission that has not changed from the day they were founded. The difference between the mission-oriented approach and a more generic approach to knowledge management are summarized in Table 5.

TABLE 5

| Characteristic/ System | Mission-oriented ContextBase (60) | Generic Knowledge |
| --- | --- | --- |
| Tangible benefit | Built in | Unknown |
| Search Space | Partitioned by mission | Un-partitioned |
| Longevity | Equal to mission longevity | Unknown |

Another benefit of the novel system for automated bot development is that it can be used for creating bots that support the performance of any entity with a quantifiable mission. It is most powerful when used to support an organization with different levels where each of the levels are linked together with mission measures that are in alignment.

Before going further it is important to compare the six context layers we have defined for our mission-oriented ContextBase (60) with more traditional designations used for capturing and organizing. FIG. 13 shows the traditional knowledge classifications. FIG. 14 shows how the knowledge classifications used by the system of the present invention. A comparison of the two figures shows that data classification and storage schema used by the system of the present invention can be readily mapped to the "traditional" classifications. The six layer classification scheme shown in FIG. 14 gives the novel system of the present invention the ability to answer the "why" questions related to mission performance while developing robust, productive bots.

In addition to providing the ability to systematically analyze and develop Complete Context™ Bots (30) that will help improve mission performance, the automated bot development system (100) provides the ability to create robust models of the factors that drive action, event and instant impact levels to vary. This capability is useful in developing the programs to improve bot performance. One of the main reasons for this is that many mission measures relate to the long term impact of actions, events and instant impacts on organization performance. This capability also enhances the ability of the system to program bots that focus on optimizing actions and impacts To facilitate its use as a tool for improving performance, the system of the present invention also produces reports in formats that are graphical and highly intuitive. By combining this capability with the previously described capabilities for: flexibly defining robust performance measures, identifying complete context information and supporting the development of robust, productive bots, the automated bot development system (100) gives executives and managers the tools they need to dramatically improve the performance of any organization with a quantifiable mission.

BRIEF DESCRIPTION OF DRAWINGS

These and other objects, features and advantages of the present invention will be more readily apparent from the following description of an embodiment of the invention in which:

FIG. 6A, FIG. 6B, FIG. 6C and FIG. 6D are block diagrams showing the sequence of steps (200) in the present invention used for specifying system settings, preparing data for processing and defining the mission measures;

FIG. 7A, FIG. 7B, FIG. 7C, FIG. 7D and FIG. 7E are block diagrams showing the sequence of steps (300) in the present invention used for creating a mission-oriented ContextBase for by organization and organization level;

DETAILED DESCRIPTION

Figure 1:
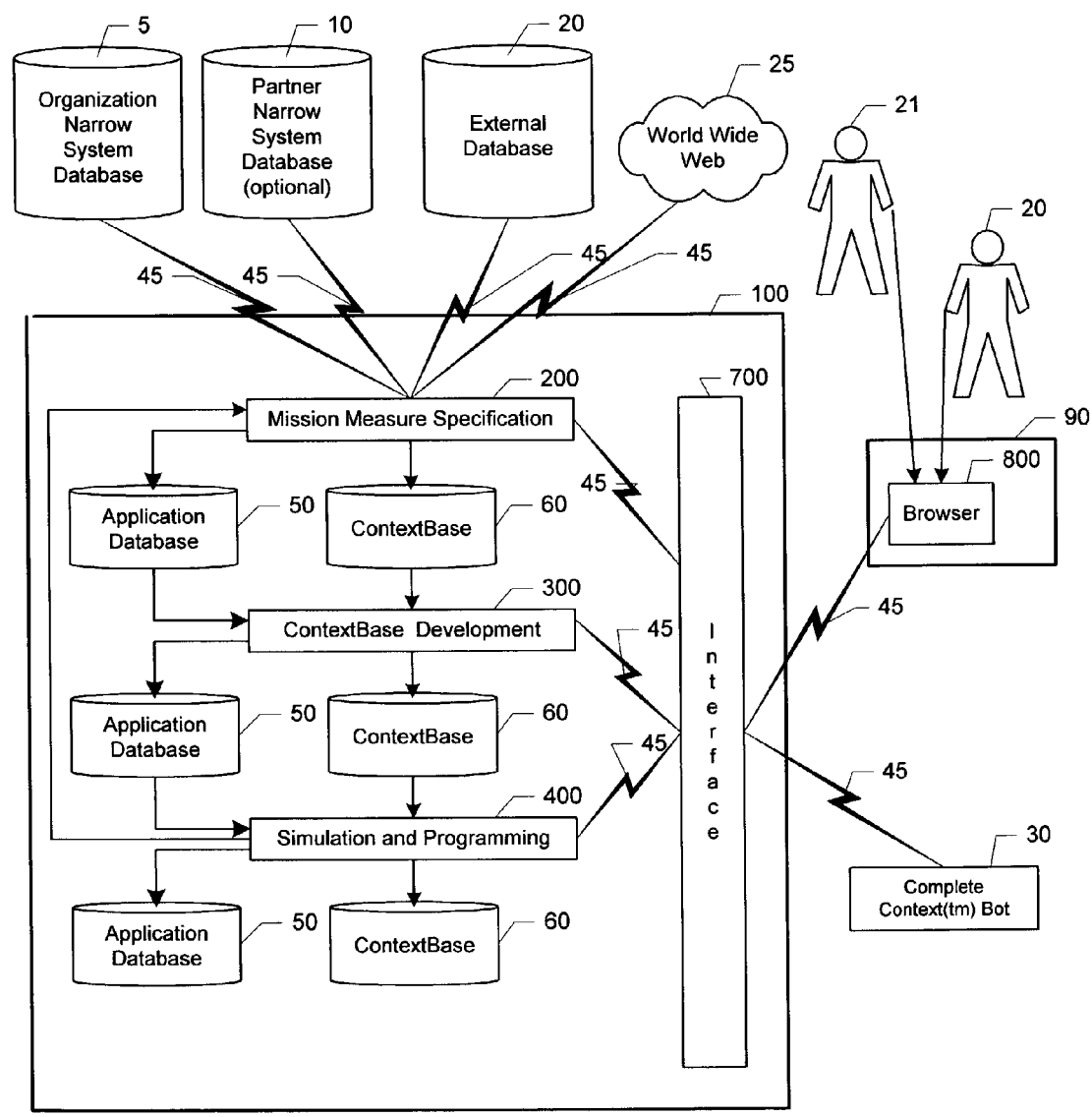
FIG. 1 is a block diagram showing the major processing steps of the present invention.
Figure 2:
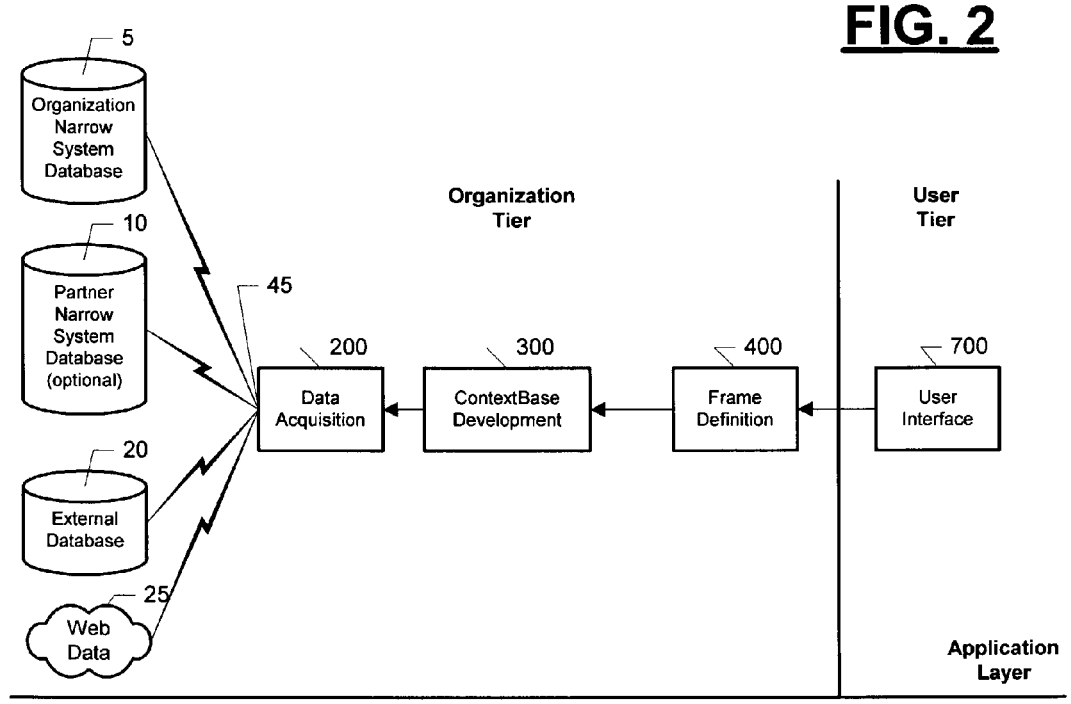
FIG. 2 is a diagrams showing the application layer portion of software architecture of the present invention.

FIG. 1 provides an overview of the processing completed by the innovative system for automated bot development. In accordance with the present invention, an automated system (100) and method for developing a mission-oriented ContextBase (60) that contains the six context layers for each mission measure by organization and organization level is provided. Processing starts in this system (100) when the data extraction portion of the application software (200) extracts data from an organization narrow system database (5); optionally, a partner narrow system database (10); an external database (20); and a world wide web (25) via a network (45). The processing completed by the system (100) may be influenced by a user (20) or a manager (21) through interaction with a user-interface portion of the application software (700) that mediates the display, transmission and receipt of all information to and from a browser software (800) such as the Netscape Navigator® or the Microsoft Internet Explorer® in an access device (90) such as a phone, personal digital assistant or personal computer where data are entered by the user (20).

While only one database of each type (5, 10 and 20) is shown in FIG. 1, it is to be understood that the system (100) can process information from all narrow systems listed in Table 2 for each organization being supported. In the embodiment, described below all functioning narrow systems within each organization will provide data to the system (100) via the network (45). It should also be understood that it is possible to complete a bulk extraction of data from each database (5, 10 and 20) and the World Wide Web (25) via the network (45) using peer to peer networking and data extraction applications. The data extracted in bulk could be stored in a single datamart, a data warehouse or a storage area network where the analysis bots in later stages of processing could operate on the aggregated data. A virtual database could also be used that would leave all data in the original databases where it could be retrieved as needed for calculations by the analysis bots over a network (45).

Figure 3:
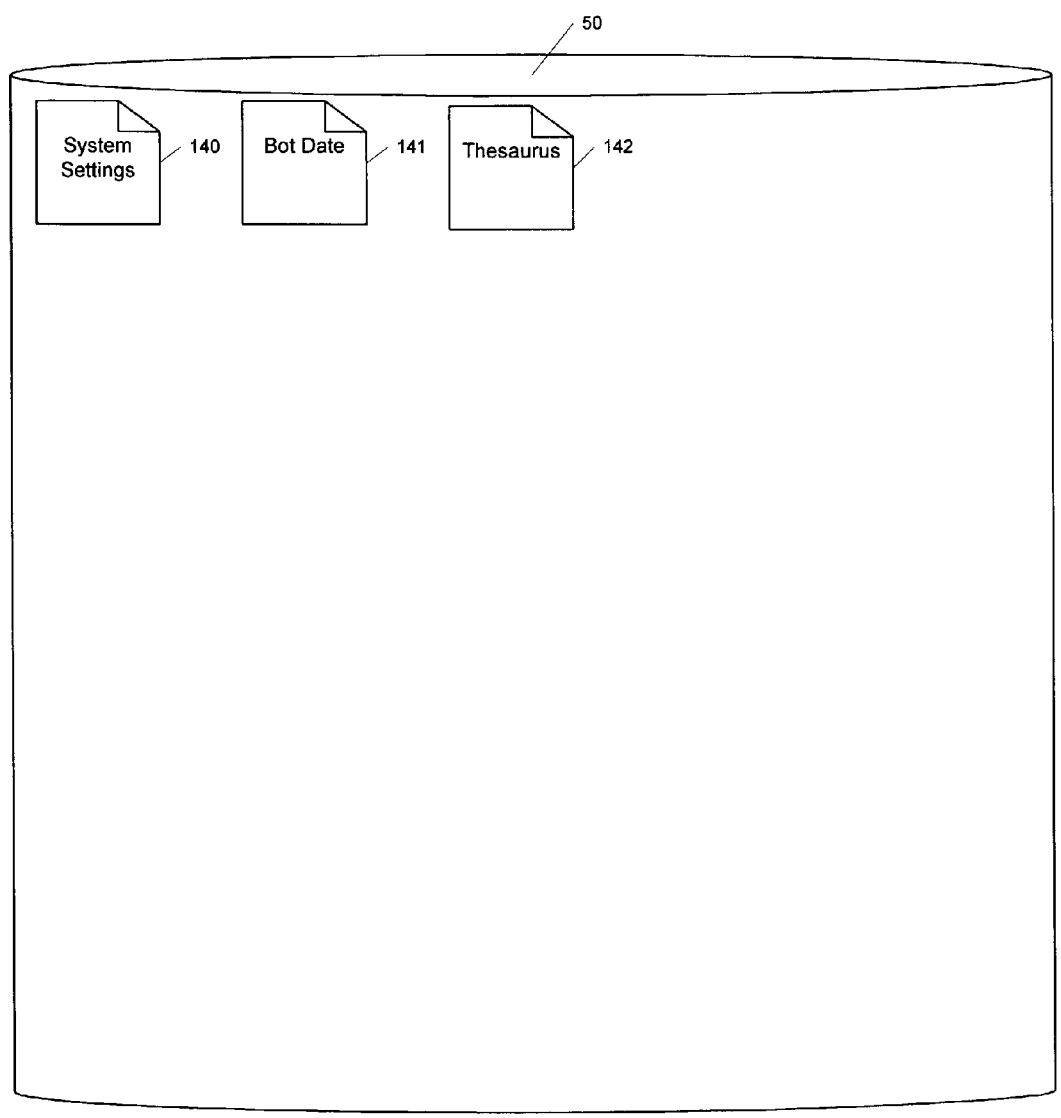
FIG. 3 is a diagram showing the tables in the application database (50) of the present invention that are utilized for data storage and retrieval during the processing in the innovative system for automated bot development.

The operation of the system of the present invention is determined by the options the user (20) and manager (21) specify and store in the application database (50) and the ContextBase (60). As shown in FIG. 3, the application database (50) contains a system settings table (140), a bot date table (141) and a Thesaurus table (142).

Figure 4:
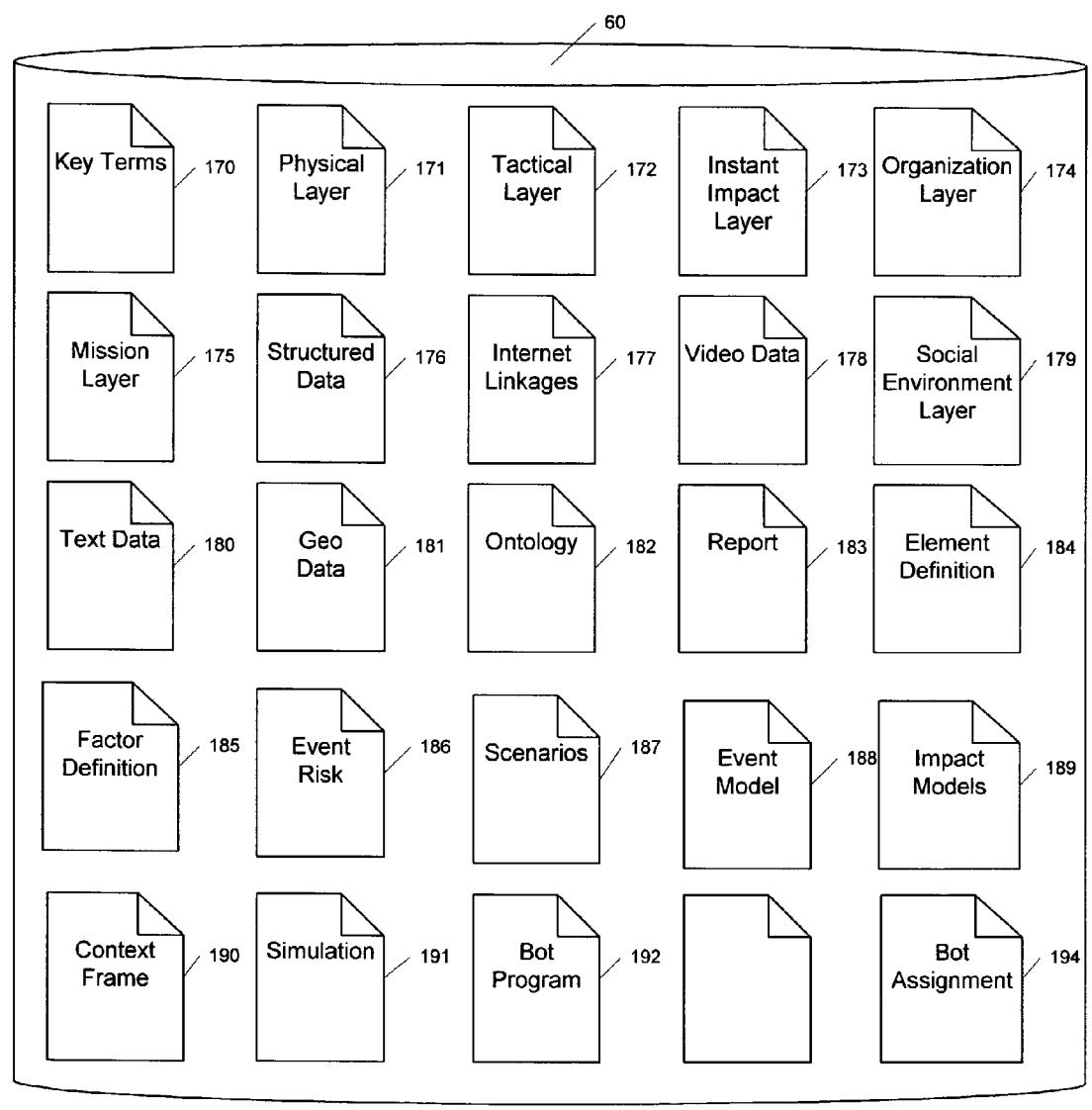
FIG. 4 is a diagram showing the tables in the ContextBase (60) of the present invention that are utilized for data storage and retrieval during the processing in the innovative system for Complete Context™ Bot (30) development.

As shown in FIG. 4, the ContextBase (60) contains tables for storing extracted information by context layer including: a mission measures table (170), a physical layer table (171), a tactical layer table (172), an instant impact layer table (173), an organization layer table (174), a mission layer table (175), a structured data table (176), an internet linkage table (177), a video data table (178), a social environment layer table (179), a text data table (180), a geo data table (181), an ontology table (182), a report table (183), an element definition table (184), a factor definition table (185), an event risk table (186), a scenarios table (187), an event model table (188), an impact model table (189), a context frame table (190) and a simulations table (191). The ContextBase (60) can exist as a database, datamart, data warehouse, a virtual repository or storage area network. The system of the present invention has the ability to accept and store supplemental or primary data directly from user input, a data warehouse or other electronic files in addition to receiving data from the databases described previously. The system of the present invention also has the ability to complete the necessary calculations without receiving data from one or more of the specified databases. However, in the embodiment described herein all required information is obtained from the specified data sources (5, 10, 20 and 25) for each organization, organization level and organization partner.

Figure 5:
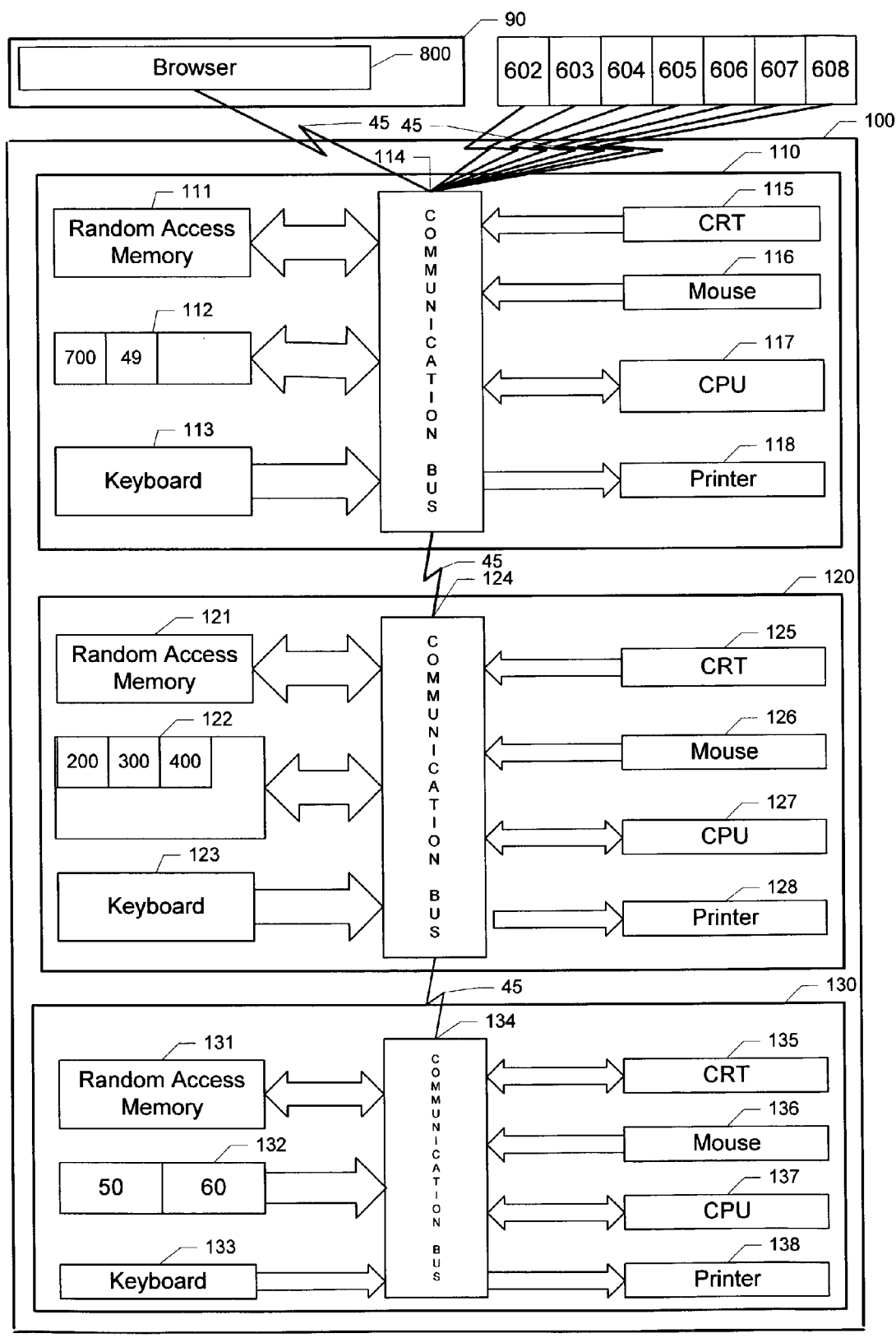
FIG. 5 is a block diagram of an implementation of the present invention.
Figure 6A:
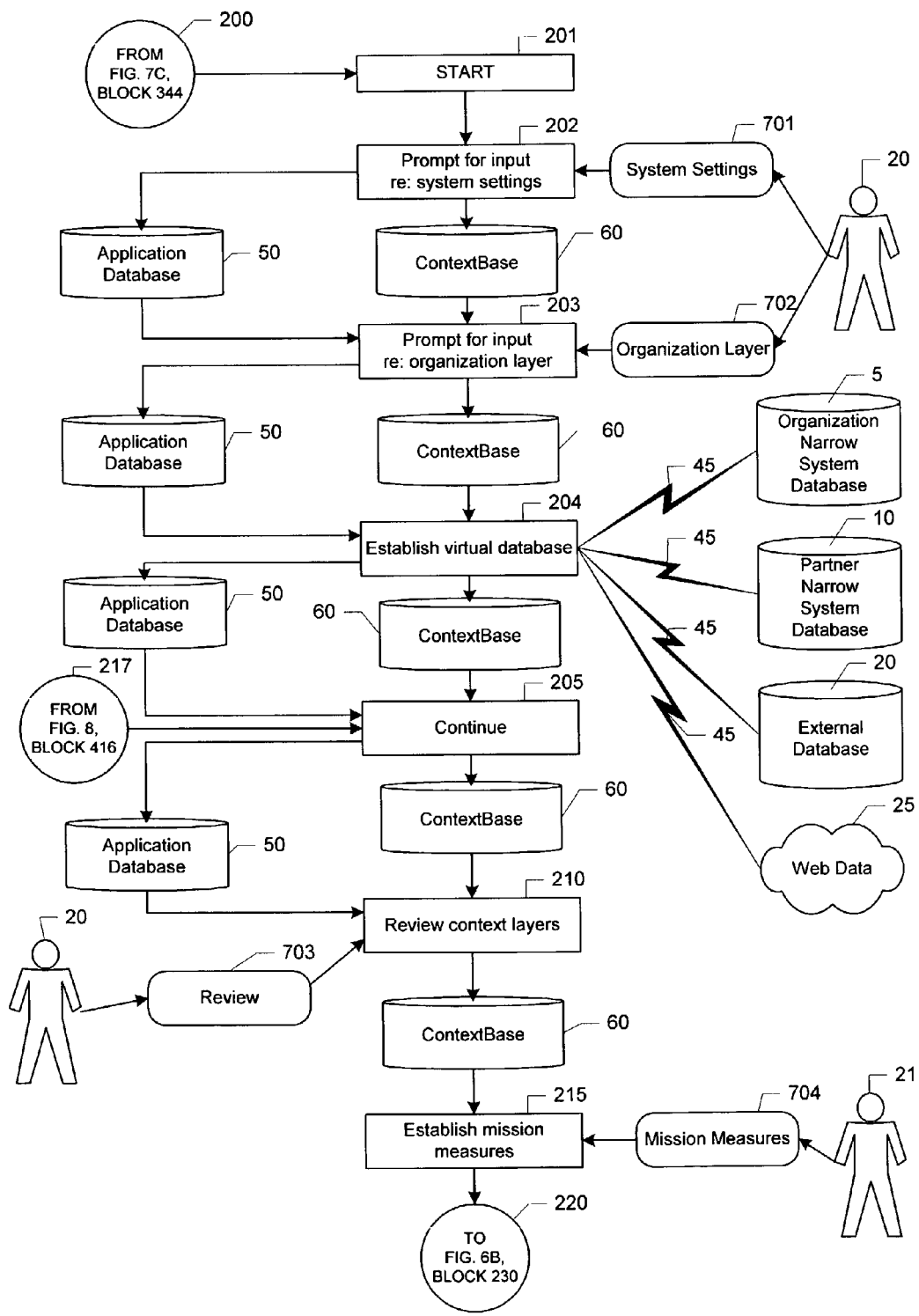
Figure 6B:
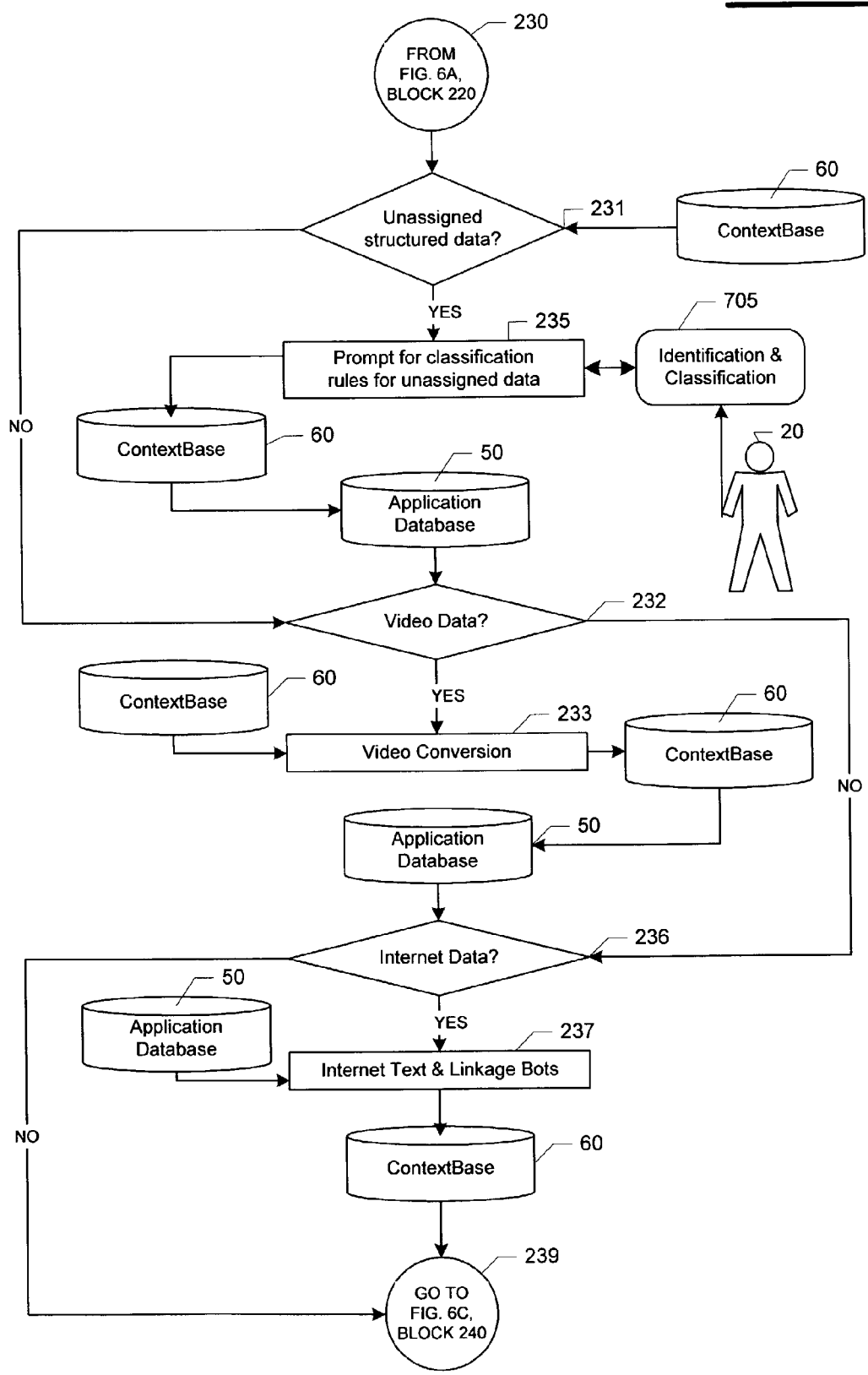
Figure 7B:
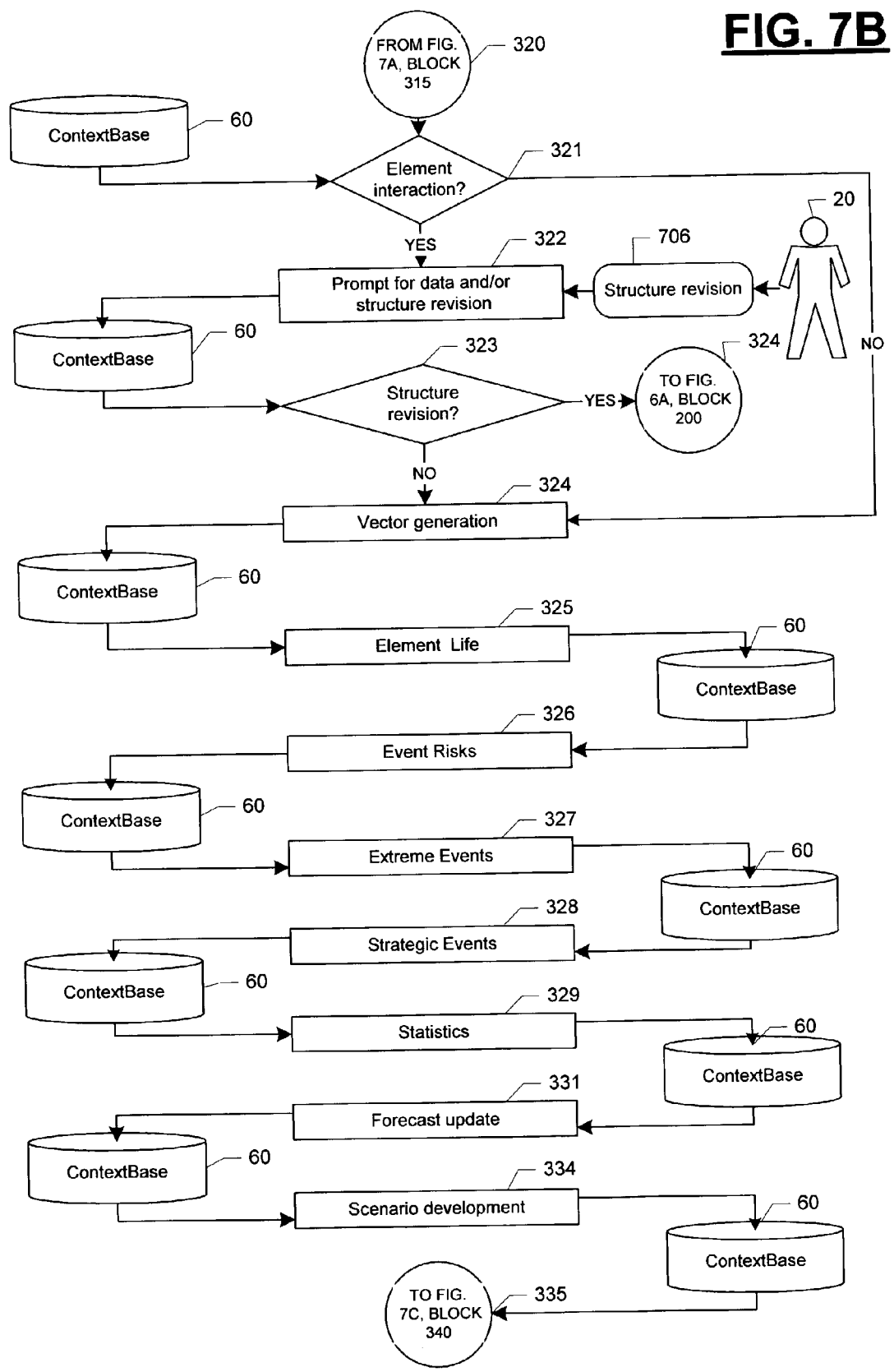
Figure 7C:
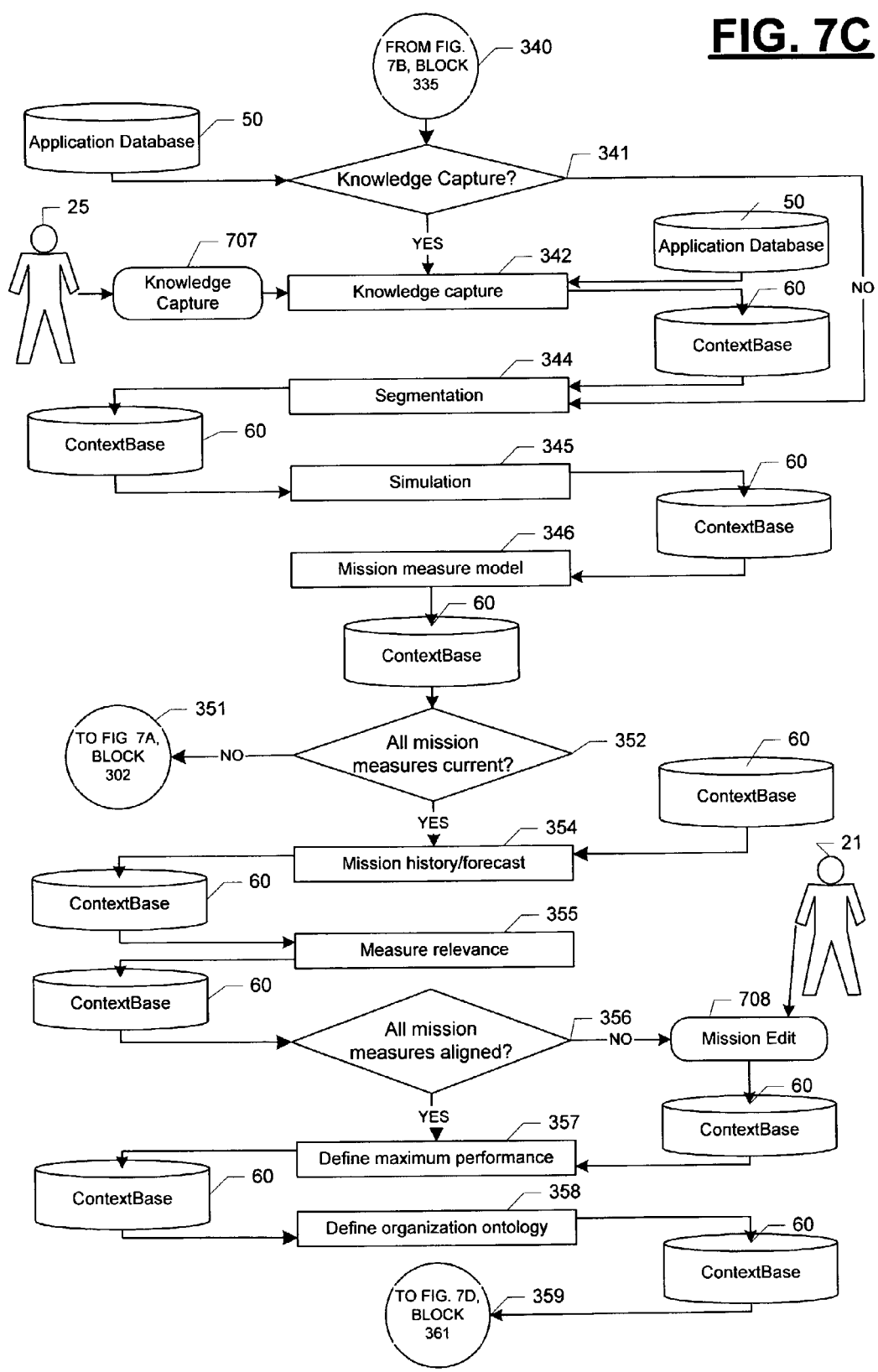
Figure 7D:
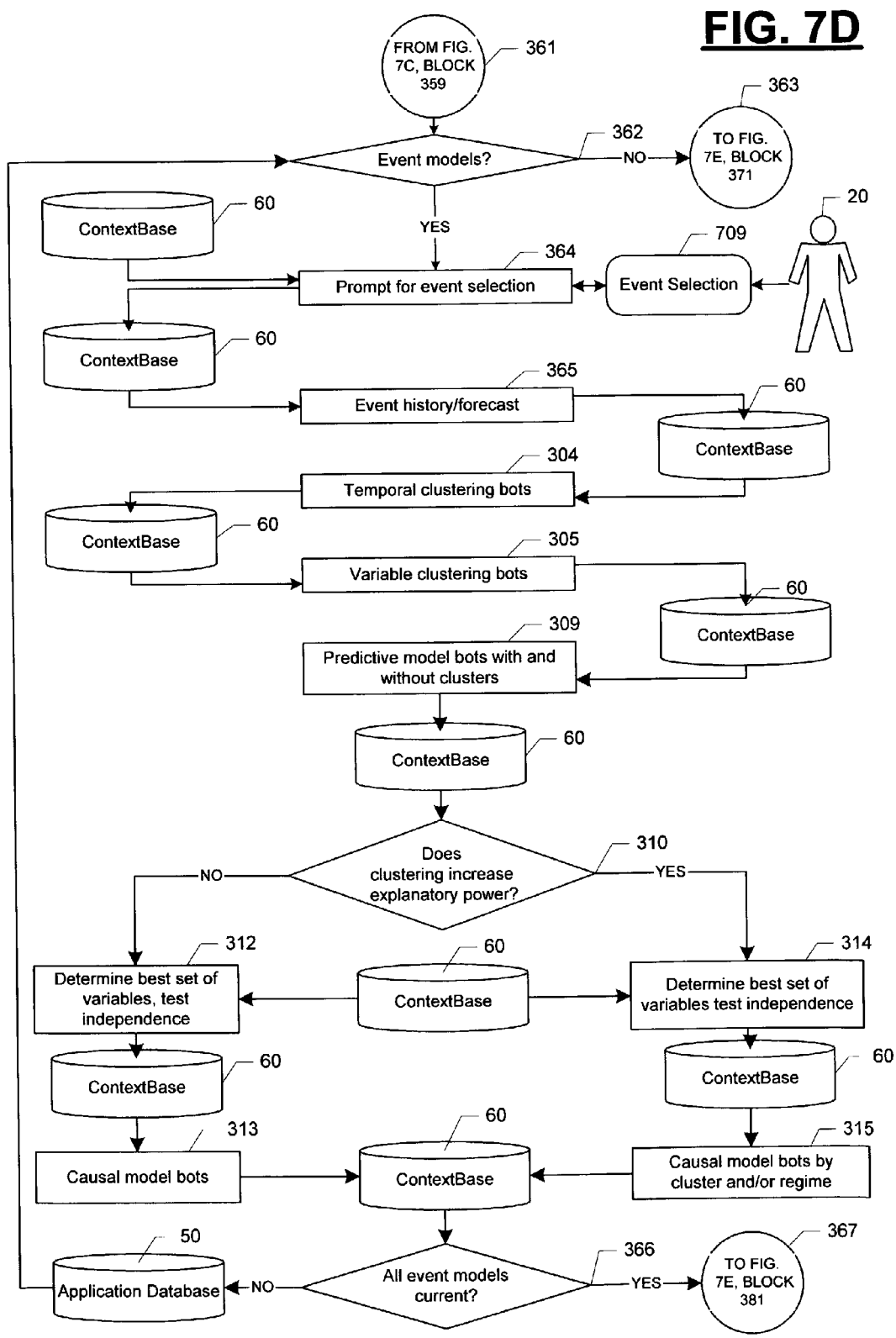
Figure 7E:
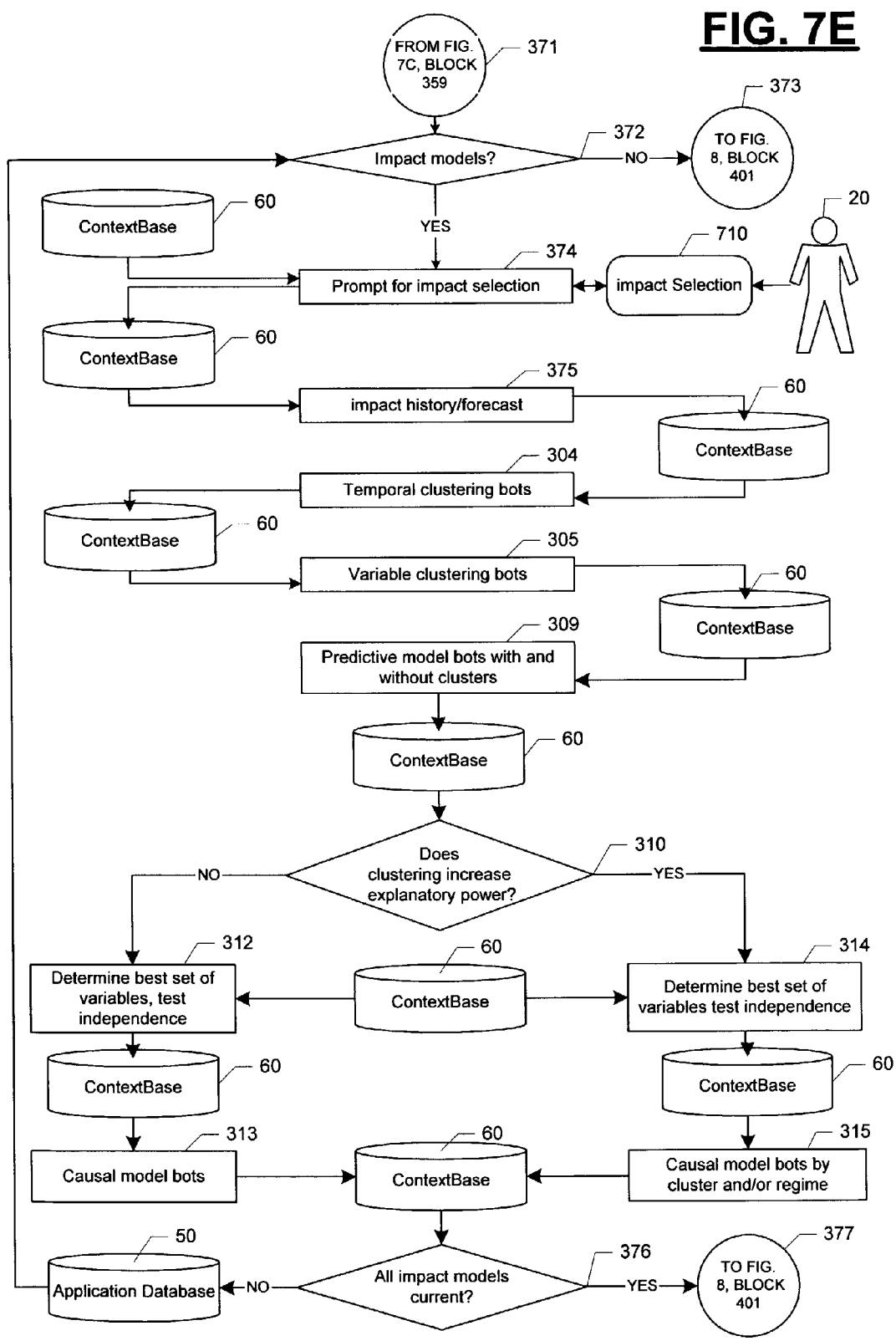

As shown in FIG. 5, an embodiment of the present invention is a computer system (100) illustratively comprised of a user-interface personal computer (110) connected to an application-server personal computer (120) via a network (45). The application-server personal computer (120) is in turn connected via the network (45) to a database-server personal computer (130). The user interface personal computer (110) is also connected via the network (45) to an Internet browser appliance (90) that contains browser software (800) such as Microsoft Internet Explorer or Netscape Navigator.

The database-server personal computer (130) has a read/write random access memory (131), a hard drive (132) for storage of the application database (50) and the ContextBase (60), a keyboard (133), a communication bus (134), a display (135), a mouse (136), a CPU (137) and a printer (138).

The application-server personal computer (120) has a read/write random access memory (121), a hard drive (122) for storage of the non-user-interface portion of the enterprise section of the application software (200, 300 and 400) of the present invention, a keyboard (123), a communication bus (124), a display (125), a mouse (126), a CPU (127) and a printer (128). While only one client personal computer is shown in FIG. 3, it is to be understood that the application-server personal computer (120) can be networked to fifty or more client, user-interface personal computers (110) via the network (45). The application-server personal computer (120) can also be networked to fifty or more server, personal computers (130) via the network (45). It is to be understood that the diagram of FIG. 5 is merely illustrative of one embodiment of the present invention as the system of the present invention could reside in a single computer or be support by a computer grid.

The user-interface personal computer (110) has a read/write random access memory (111), a hard drive (112) for storage of a client data-base (49) and the user-interface portion of the application software (700), a keyboard (113), a communication bus (114), a display (115), a mouse (116), a CPU (117) and a printer (118).

The application software (200, 300 and 400) controls the performance of the central processing unit (127) as it completes the calculations required to support automated bot development. In the embodiment illustrated herein, the application software program (200, 300 and 400) is written in a combination of Java and C#. The application software (200, 300 and 400) can use Structured Query Language (SQL) for extracting data from the databases and the World Wide Web (5, 10, 20 and 25). The Complete Context™ Bots (30) can use DAML Query Language (DQL) for interacting with bots from other organizations. The user (20) and manager (21) can optionally interact with the user-interface portion of the application software (700) using the browser software (800) in the browser appliance (90) to provide information to the application software (200, 300 and 400) for use in determining which data will be extracted and transferred to the ContextBase (60) by the data bots.

User input is initially saved to the client database (49) before being transmitted to the communication bus (124) and on to the hard drive (122) of the application-server computer via the network (45). Following the program instructions of the application software, the central processing unit (127) accesses the extracted data and user input by retrieving it from the hard drive (122) using the random access memory (121) as computation workspace in a manner that is well known.

The computers (110, 120, 130) shown in FIG. 5 illustratively are personal computers or workstations that are widely available. Typical memory configurations for client personal computers (110) used with the present invention should include at least 1028 megabytes of semiconductor random access memory (111) and at least a 200 gigabyte hard drive (112). Typical memory configurations for the application-server personal computer (120) used with the present invention should include at least 5128 megabytes of semiconductor random access memory (121) and at least a 300 gigabyte hard drive (122). Typical memory configurations for the database-server personal computer (130) used with the present invention should include at least 5128 megabytes of semiconductor random access memory (131) and at least a 750 gigabyte hard drive (132).

Using the system described above, data is extracted from the narrowly focused enterprise systems, external databases and the world wide web as required to develop a ContextBase (60), create context frames and program Complete Context™ Bots (30). Before going further, we need to define a number of terms that will be used throughout the detailed description of an embodiment of the automated bot development system (100):

1. A transaction is any event that is logged or recorded (actions are a subset of events);
2. Transaction data are any data related to a transaction;
3. Descriptive data are any data related to an element, factor, event or commitment. Descriptive data includes forecast data and other data calculated by the system of the present invention;
4. An element of performance (or element) is "an entity or group that as a result of past transactions, forecasts or other data has provided and/or is expected to benefit to one or more organization mission measures";
5. An item is a single member of the group that defines an element of performance. For example, an individual salesman would be an "item" in the "element of performance" sales staff. It is possible to have only one item in an element of performance;
6. Item variables are the transaction data and descriptive data associated with an item or related group of items;
7. Item performance indicators are data derived from transaction data and/or descriptive data for an item;
8. Composite variables for an element are mathematical or logical combinations of item variables and/or item performance indicators;
9. Element variables or element data are the item variables, item performance indicators and composite variables for a specific element or sub-element of performance;
10. External factors (or factors) are numerical indicators of: conditions external to the organization, conditions of the organization compared to external expectations of organization conditions or the performance of the organization compared to external expectations of organization performance;
11. Factor variables are the transaction data and descriptive data associated with external factors;
12. Factor performance indicators are data derived from factor transaction data and/or descriptive data;
13. Composite factors are mathematical or logical combinations of factor variables and/or factor performance indicators for a factor;
14. Factor data are defined as the factor variables, factor performance indicators and composite factors;
15. A layer is software and/or information that gives an application, system or layer the ability to interact with another layer, system, application or set of information at a general or abstract level rather than at a detailed level;
16. An organization is defined as an entity with a mission and one or more defined, quantified mission measures, organizations include multi-enterprise organizations and enterprises;
17. An organization level is defined as a subset of an organization characterized by one or more quantifiable measures, organization levels include divisions, departments, teams and individuals;
18. A value chain is defined by two or more organizations that have joined together to complete one or more actions;
19. A combination is defined by two or more organizations that have joined together to plan and/or complete one or more actions (value chains are a subset of combinations);
20. Frames are sub-sets of an organization level or combination that can be analyzed separately. For example, one frame could group together all the elements and external factors by process allowing each process in an organization to be analyzed by outside vendors. Another frame could exclude the one mission measure from each enterprise within a multi-enterprise organization. Frames can also be used to store short and long term plan information;
21. Context frames include all information relevant to measure performance for a defined subset of an organization. Context frames include the elements of performance, resources, risks, environmental factors, context layers and organization levels relevant to performance measurement for the defined subset;
22. Full context frames are context frames that contain all relevant data from the six context layers (physical, tactical, instant, organization, mission and social environment) for a specified combination of organization levels and organizations;
23. Administrative context frames are context frames that contain all relevant data from the first three context layers (physical, tactical and instant) for a specified organization level;
24. Strategic context frames are context frames that contain all relevant data from the last three context layers (organization, mission and social environment) for a specified organization level;
25. Complete Context is a designation for applications and bots that can process full context frames;
26. ContextBase is a database that organizes data by context layer;
27. Risk is defined as events or variability that cause reduced performance;
28. Total risk for an organization with publicly traded equity is defined by the implied volatility associated with organization equity. The amount of implied volatility can be determined by analyzing the option prices for organization equity. For organizations without publicly traded equity, total risk is the sum of all variability risks and event risks;
29. Variability risk is a subset of total risk. It is the risk of reduced or impaired performance caused by variability in external factors and/or elements of performance. Variability risk is generally quantified using statistical measures like standard deviation per month, per year or over some other time period. The covariance between different variability risks is also determined as simulations require quantified information regarding the interrelationship between the different risks to perform effectively;
30. Factor variability (or factor variability risk) is a subset of variability risk. It is the risk of reduced performance caused by external factor variability;
31. Element variability (or element variability risk) is a subset of variability risk. It is the risk of reduced performance caused by the variability of an element of performance;
32. Event risk is a subset of total risk. It is the risk of reduced performance caused by an event. Most insurance policies cover event risks. For example, an insurance policy might state that: if this event happens, then we will reimburse event related expenses up to a pre-determined amount. Other event risks including customer defection, employee resignation and supplier bankruptcy are generally overlooked by traditional risk management systems;
33. Standard event risk is a subset of event risk. It is the risk associated with events that have a one time impact;
34. Extreme event risk is a subset of event risk. It is the risk associated with events that have a one time impact three or more standard deviations above the average impact for an event;
35. Contingent liabilities are a subset of event risk. They are liabilities the organization may have at some future date where the liability is contingent on some event occurring in the future, therefore they can be considered as a type of event risk. They are different from standard event risks in that the amount of "damage" is often defined contractually and is known in advance;
36. Strategic risk (or strategic event risk) is a subset of event risk. It is the risk associated with events that can have a permanent impact on the performance of an organization level or organization. Examples of strategic risk would include:
the risk that a large new competitor enters the market and the risk that a new technology renders existing products obsolete;
37. Real options are defined as options the organization may have to make a change in its operation at some future date—these can include the introduction of a new product, the ability to shift production to lower cost environments, etc.
Real options are generally supported by the elements of performance of an organization;
38. Narrow systems are the systems listed in Table 2 and any other system that supports the analysis, measurement or management of an element, event, commitment or priority of an organization or organization level;
39. The efficient frontier is the curve defined by the maximum performance the organization can expect for given levels of risk; and
40. Bots are entities that complete actions, analyze data and make recommendations in an automated fashion—they include software bots—the more traditional definition.

We will use the terms defined above when detailing an embodiment of the present invention. In this invention, analysis bots are used to determine element of performance lives and the percentage of element performance that is attributable to each element of performance by organization level. The resulting values are then added together to determine the contribution of each element of performance to the mission performance at each organization level. External factor contributions and risk impacts are calculated in a similar manner, however, they generally do not have defined lives.

Figure 8:
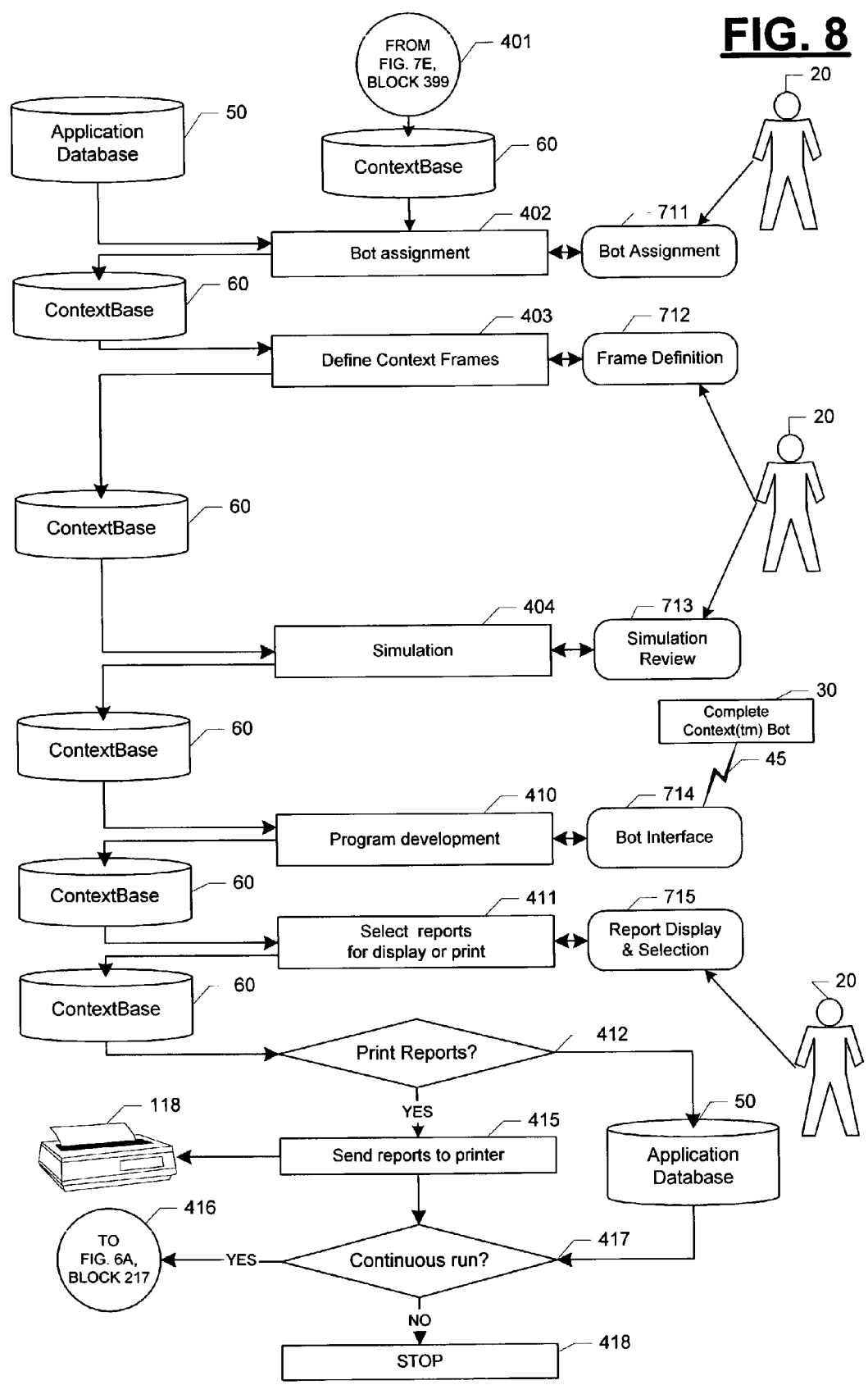
FIG. 8 is a block diagram showing the sequence in steps (400) in the present invention used in defining context frames, programming bots and printing reports.
Figure 9:
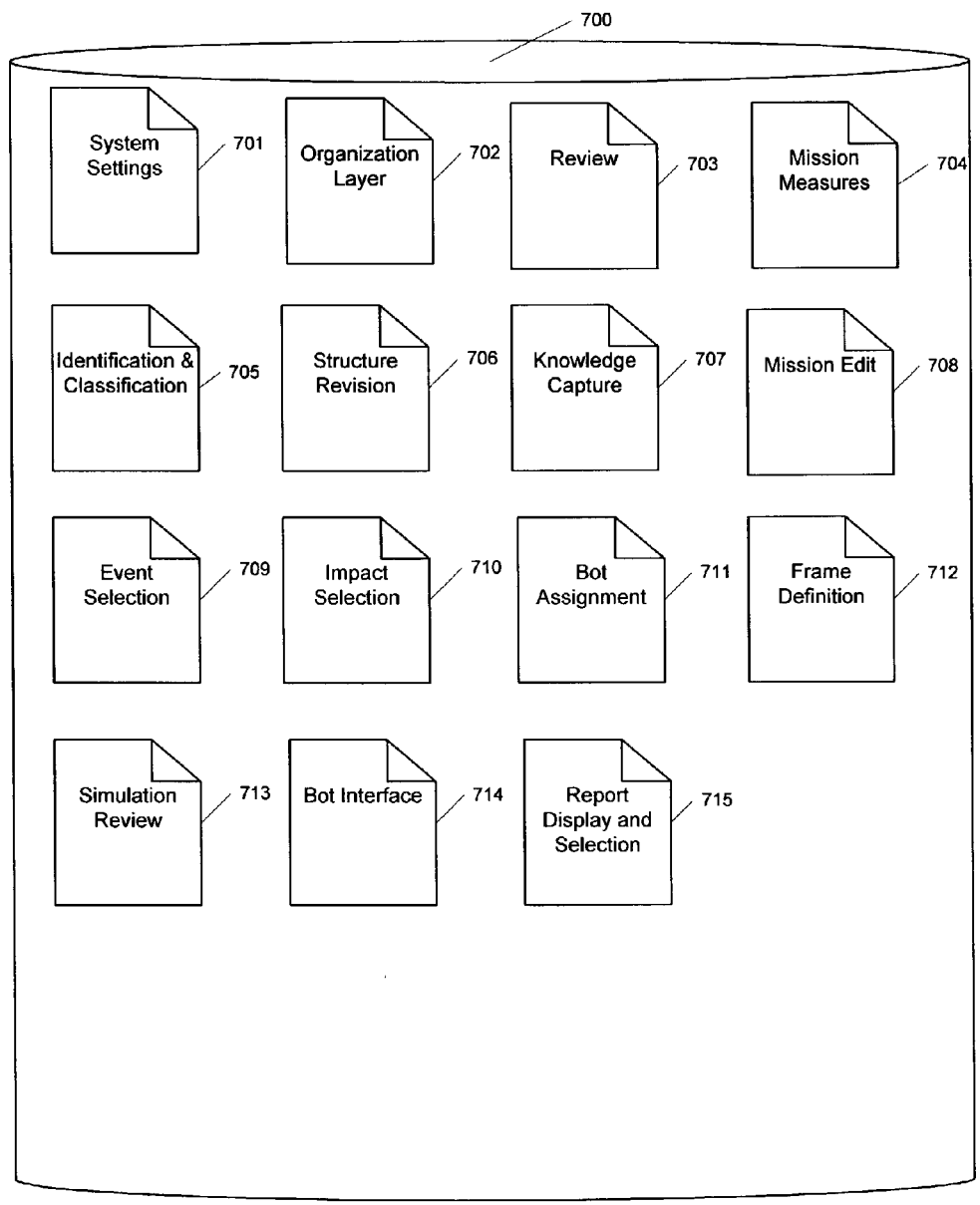
FIG. 9 is a diagram showing the data windows that are used for receiving information from and transmitting information via the interface (700)

As discussed previously, the automated bot development system (100) completes processing in three distinct stages. As shown in FIG. 6A, FIG. 6B, FIG. 6C and FIG. 6D the first stage of processing (block 200 from FIG. 1) extracts data, defines mission measures and prepares data for the next stage of processing. As shown in FIG. 7A, FIG. 7B, FIG. 7C, FIG. 7D and FIG. 7E the second stage of processing (block 300 from FIG. 1) develops and then continually updates the mission-oriented ContextBase (60) by organization and organization level. As shown in FIG. 8, in the third and final stage of processing (block 400 from FIG. 1) prepares context frames for use in simulations, completes simulations and uses the results of the simulations to define programs for Complete Context™ Bots (30). The third stage of process can also prepare and print reports. If system processing is continuous, then the processing described above is continuously repeated.

Mission Measure Specification

The flow diagram in FIG. 6A, FIG. 6B, FIG. 6C and FIG. 6D details the processing that is completed by the portion of the application software (200) that establishes a virtual database for data from other systems that is available for processing, prepares unstructured data for processing and accepts user (20) and management (21) input as required to define the mission measures for each organization level. As discussed previously, the system of the present invention is capable of accepting data from all the narrowly focused systems listed in Table 2. Data extraction, processing and storage is completed by organization and organization level. Operation of the system (100) will be illustrated by describing the extraction and use of structured data from a narrow system database (5) for supply chain management and an external database (20). A brief overview of the information typically obtained from these two databases will be presented before reviewing each step of processing completed by this portion (200) of the application software.

Supply chain systems are one of the seventy plus narrow systems identified in Table 2. Supply chain databases are a type of narrow system database (5) that contain information that may have been in operation management system databases in the past. These systems provide enhanced visibility into the availability of resources and promote improved coordination between organizations and their suppliers. All supply chain systems would be expected to track all of the resources ordered by an organization after the first purchase. They typically store information similar to that shown below in Table 7.

TABLE 7

Supply chain system information

| 1. | Stock Keeping Unit (SKU) |
| 2. | Vendor |
| 3. | Total quantity on order |
| 4. | Total quantity in transit |
| 5. | Total quantity on back order |
| 6. | Total quantity in inventory |
| 7. | Quantity available today |
| 8. | Quantity available next 7 days |
| 9. | Quantity available next 30 days |
| 10. | Quantity available next 90 days |

TABLE 7-continued

Supply chain system information

| 11. | Quoted lead time |
| 12. | Actual average lead time |

External databases (20) are used for obtaining information that enables the definition and evaluation of elements of performance, external factors and event risks. In some cases, information from these databases can be used to supplement information obtained from the other databases and the Internet (5 and 10). In the system of the present invention, the information extracted from external databases (20) includes the data listed in Table 8.

TABLE 8

External database information

1. Text information such as that found in the Lexis Nexis database;
2. Text information from databases containing past issues of specific publications,
3. Geospatial data;
4. Multimedia information such as video and audio clips; and
5. Event risk data including information about risk probability and magnitude System processing of the information from the different databases (5, 10 and 20) and the World Wide Web (25) described above starts in a block 202, FIG. 6A. The software in block 202 prompts the user (20) via the system settings data window (701) to provide system setting information. The system setting information entered by the user (20) is transmitted via the network (45) back to the application-server (120) where it is stored in the system settings table (140) in the application database (50) in a manner that is well known. The specific inputs the user (20) is asked to provide at this point in processing are shown in Table 9.

TABLE 9*

1. Continuous, If yes, new calculation frequency? (by minute, hour, day, week, etc.)
2. Organization(s) (can include partners)
3. Organization structure(s) (organization levels, combinations)
4. Organization industry classification(s) (SIC Code)
5. Names of primary competitors by SIC Code
6. Base account structure
7. Base units of measure
8. Base currency
9. Knowledge capture from subject matter expert? (yes or no)
10. Event models? (yes or no)
11. Instant impact models? (yes or no)
12. Video data extraction? (yes or no
13. Internet data extraction? (yes or no)
14. Text data analysis? (if yes, then specify maximum number of relevant words)
15. Geo-coded data? (if yes, then specify standard)
16. Maximum number of generations to process without improving fitness
17. Maximum number of clusters (default is six)
18. Management report types (text, graphic or both)
19. Missing data procedure (chose from selection)
20. Maximum time to wait for user input
21. Maximum number of sub elements
22. Most likely scenario, normal, extreme or mix (default is normal)
23. Simulation time periods
24. Risk free interest rate
25. Date range for history-forecast time periods (optional)
26. Minimum working capital level (optional)

*settings over 4 for each organization level (if different)

The system settings data are used by the software in block 202 to establish organization levels and context layers. As described previously, there are six context layers for each organization level. The application of the remaining system settings will be further explained as part of the detailed explanation of the system operation. The software in block 202 also uses the current system date to determine the time periods (generally in months) that require data to complete the calculations. The analysis of organization level performance by the system utilizes data from every data source for the four year period before and the three year forecast period after the date of system calculation. The user (20) also has the option of specifying the data periods that will be used for completing system calculations. After the date range is calculated it is stored in the system settings table (140) in the application database (50), processing advances to a software block 203.

Figure 12:
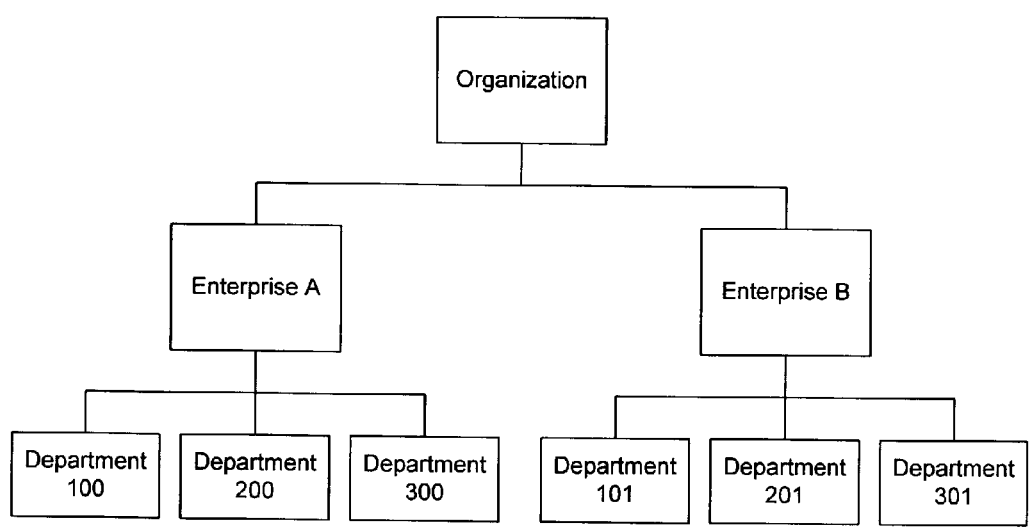
FIG. 12 is a block diagram shown the relationship between different organization levels.
Figure 13:
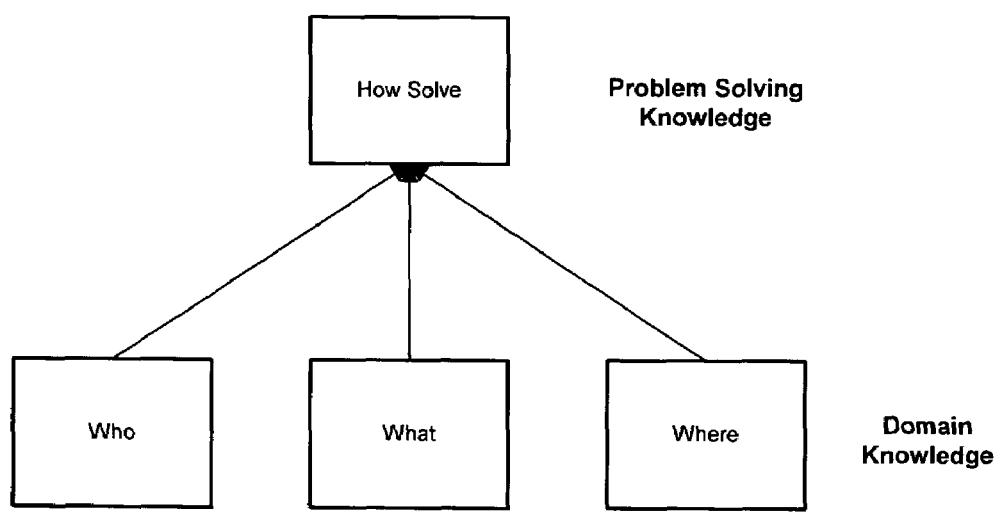
FIG. 13 is a diagram showing the traditional classification schema for knowledge management.
Figure 14:
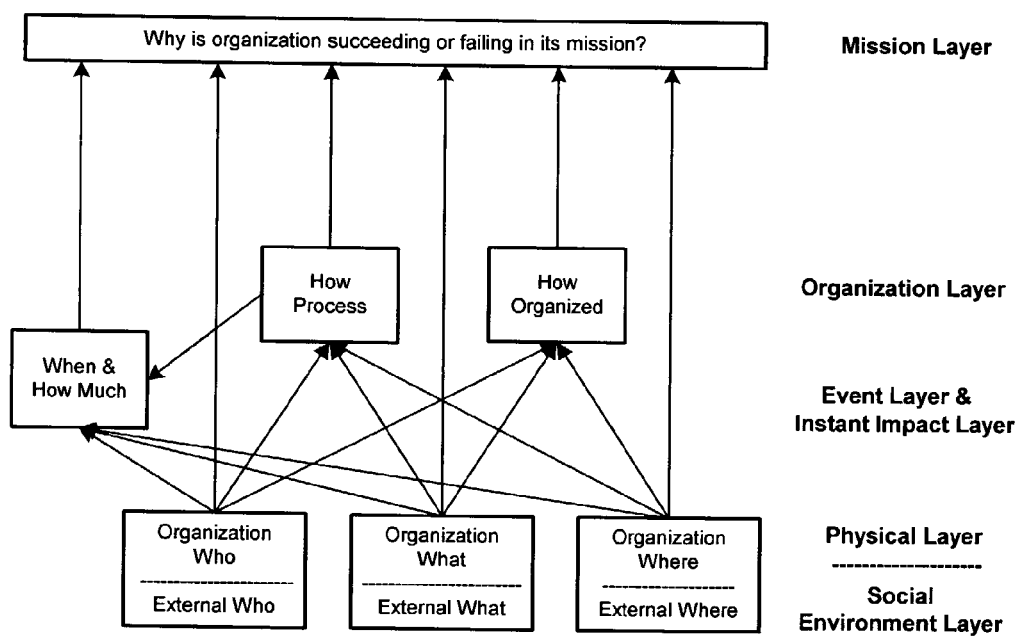
FIG. 14 is a block diagram showing the six layer classification schema of the present invention.

The software in block 203 prompts the user (20) via the organization layer data window (702) to define the different organization levels, define process maps, identify the elements and factors relevant to each organization level and graphically depict the relationship between the different organization levels that were saved in the system settings (140). For example, an organization could have two enterprises with each enterprise having three departments as shown in FIG. 12. In the case shown in FIG. 12 there would be nine organization levels as shown in Table 10.

TABLE 10

| Organization Level | Location in example hierarchy |
|---|---|
| 1. Organization | Highest Level |
| 2. Enterprise A | Middle Level |
| 3. Enterprise A - Department 100 | Lowest Level |
| 4. Enterprise A - Department 200 | Lowest Level |
| 5. Enterprise A - Department 300 | Lowest Level |
| 6. Enterprise B | Middle Level |
| 7. Enterprise B - Department 101 | Lowest Level |
| 8. Enterprise B - Department 201 | Lowest Level |
| 9. Enterprise B - Department 301 | Lowest Level |

In the system of the present invention an item within an element of performance is the lowest organization level. The organization level and process map relationships identified by the user (20) are stored in the organization layer table (174) in the ContextBase (60). It is also possible to obtain the organization layer information directly from narrow system input. The element and factor definitions by organization level are stored in the element definition table (184) and the factor definition table (185) in the ContextBase (60) After the data is stored, processing advances to a software block 204.

The software in block 204 communicates via a network (45) with the different databases (5, 10, and 20) that are providing data to the Automated bot development system. As described previously, a number of methods can be used to identify the different data sources and make the information available for processing including bulk data extraction and point to point data extraction using bots or ETL (extract, test and load) utilities. Data from the lower levels of the hierarchy are automatically included in the context layers for the higher organization levels. In the embodiment being discussed the systems providing data are identified using UDDI protocols. The databases in these systems (5, 10 and 20) use XML tags that identify the organization level, context layer, element assignment and/or factor association for each piece of data. In this stage of processing the software in block 204 stores the location information for the data of interest as required to establish a virtual database for the administrative layers for each organization level that was specified in the system settings table (140). Establishing a virtual database eliminates the latency that can cause problems for real time processing. The virtual database information for the physical layer for each organization level is stored in the physical layer table (171) in the ContextBase (60). The virtual database information for the tactical layer for each organization level is stored in the tactical layer table (172) in the ContextBase (60). The virtual database information for the instant layer for each organization level is stored in the instant impact layer table (173) in the ContextBase (60).

Structured data that was made available for processing that could not be mapped to an administrative context layer, organization level, factor and/or element is stored in the structured data table (176) in the Context Base (60). World Wide Web data that needs to be processed before being mapped to a context layer, organization level, factor and/or element are identified using a virtual database stored in the Internet data table (177) in the ContextBase (60). Video data that needs to be processed before being mapped to a context layer, organization level, factor and/or element are identified using a virtual database stored in the video data table (178) in the ContextBase (60). Unstructured text data that needs to be processed before being mapped to a context layer, organization level, factor and/or element are identified using a virtual database stored in the text data table (180) in the ContextBase (60). Geo-coded data that needs to be processed before being mapped to a context layer, organization level, factor and/or element are identified using a virtual database stored in the geo data table (181) in the ContextBase (60). In all cases, data from narrow partner system databases (10) can be extracted and stored in a manner similar to that described for organization narrow system data. This data can include feature designations that define the acceptable range for data that are changed during optimization calculations. After virtual databases have been created that fully account for all available data from the databases (5, 10 and 20) and the World Wide Web (25), processing advances to a software block 205 and then on to a software block 210.

The software in block 210 prompts the user (20) via the review data window (703) to review the elements and factors by context layer that have been identified in the first few steps of processing. The element—context layer assignments and the factor—context layer assignments were created by mapping data to their "locations" within the ContextBase (60) using xml tag designations. The user (20) has the option of changing these designations on a one time basis or permanently. Any changes the user (20) makes are stored in the table for the corresponding context layer (i.e. tactical layer changes are saved in the tactical layer table (172), etc.). As part of the processing in this block, the user (20) is given the option to establish data categories for each context layer using an interactive GEL algorithm that guides the process of category development. The newly defined categories are mapped to the appropriate data in the appropriate context layer and stored in the organization layer table (174) in the ContextBase (60). The user (20) is also prompted by the review data window (703) to use data and/or the newly created data categories from each context layer to define six of the nine key terms—element, agent, asset, resource, action and commitment (mission measures and priorities will be defined in the next step) for each organization level. The resulting definitions are saved in the key terms table (170) in the ContextBase (60) by organization and organization level. Finally, the user (20) is prompted to define transaction data that do not correspond to one of the six key terms. For example, transaction data may relate to a cell phone call or an email—both events that are not defined as actions for the current organization level. The user (20) will define these events using standardized definitions from a Thesaurus table (142) in the application database (50) with synonyms that match business concepts like "transfer", "return" and "expedite" as required to define each transaction. The information from the Thesaurus table (142) can be supplemented from on line lexicons like WordNet. In any event, the new definitions are also stored in the key terms table (170) in the ContextBase (60) before processing advances to a software block 215.

The software in block 215 prompts the manager (21) via the mission measure data window (704) to use the key term definitions established in the prior processing step to specify one or more mission measures for each organization level. The manager (21) is given the option of using pre-defined mission measures for evaluating the performance of a commercial organization or defining new mission measures using internal and/or external data. If more than one mission measure is defined for a given organization level, then the manager (21) is prompted to assign a weighting or relative priority to the different mission measures that have been defined. The software in this block also prompts the manager (21) to identify keywords that are relevant to mission performance for each organization level in each organization. After the mission measure definitions are completed, the value of the newly defined mission measures are calculated using historical data and forecast data and stored in the mission layer table (175) by organization and organization level. After this has been completed, the mission measure definitions, priorities and keywords are stored in the key terms table (170) in the ContextBase (60) by organization and organization level before processing advances to a software block 231.

The software in block 231 checks the structured data table (176) in the ContextBase (60) to see if there is any structured data that has not been assigned to an organization level and/or context layer. If there is no structured data without a complete assignment (organization, organization level, context layer and element or factor assignment constitutes a complete assignment), then processing advances to a software block 232. Alternatively, if there are structured data without an assignment, then processing advances to a software block 235.

The software in block 235 prompts the manager (21) via the identification and classification data window (705) to identify the context layer, organization level, element assignment or factor assignment for the structured data in table 176. After assignments have been specified for every data element, the resulting assignment are stored in the appropriate context layer table in the ContextBase (60) by organization and organization level before processing advances to a software block 232.

The software in block 232 checks the system settings table (140) in the Application Database (50) to see if video data extraction is going to be used in the current analysis. If video data extraction is not being used, then processing advances to a software block 236. Alternatively, if video data extraction is being used, then processing advances to a software block 233.

The software in block 233 extracts text from the video data stored in the video data table (178) and stores the resulting text in the text table (180) in the ContextBase (60).

The information in the video comes in two parts, the narrative associated with the image and the image itself. In the preferred embodiment, the narrative portion of the video has been captured in captions. These captions along with information identifying the time of first broadcast are stored in the text table (180). This same procedure can also be used for capturing data from radio broadcasts. If captions are not available, then any of a number of commercially available voice recognition programs can be used to create text from the narratives. The image portion of the video requires conversion. The conversion of video into text requires the use of several conversion algorithms and a synthesis of the results from each of the different algorithms using a data fusion algorithm. The algorithms used for video conversion include: coefficient energy block classification, local stroke detection and merge and graphics/text block classification. Again, the resulting text information along with information identifying the time of first broadcast are stored in the text table (180) before processing advances to a software block 236.

The software in block 236 checks the system settings table (140) in the Application Database (50) to see if internet data extraction is going to be used in the current analysis. If internet data extraction is not being used, then processing advances to a software block 241. Alternatively, if internet data extraction is being used, then processing advances to a software block 237.

The software in block 237 checks the bot date table (141) and deactivates internet text and linkage bots with creation dates before the current system date and retrieves information from the key terms table (180). The software in block 237 then initializes text bots for each keyword stored in the key terms table. The bots are programmed to activate with the frequency specified by user (20) in the system settings table (140).

Bots are independent components of the application that have specific tasks to perform. In the case of internet text and linkage bots, their tasks are to locate and extract keyword matches and linkages from the World Wide Web (25) and then store the extracted text in the text data table (180) and the linkages in the internet linkages table (177) in the ContextBase (60). Every Internet text and linkage bot contains the information shown in Table 11.

TABLE 11

1. Unique ID number (based on date, hour, minute, second of creation)
2. Creation date (date, hour, minute, second)
3. Storage location
4. Mapping information
5. Home URL
6. Linkage URL (if any)
7. Organization
8. Organization Level
9. Keyword After being initialized, the text and linkage bots locate, extract and store text and linkages from the World Wide Web (25) in accordance with their programmed instructions with the frequency specified by user (20) in the system settings table (140). These bots will continually extract data as system processing advances a software block 241.

The software in block 241 checks the system settings table (140) to see if text data analysis is being used. If text data analysis is not being used, then processing advances to a block 246. Alternatively, if the software in block 241 determines that text data analysis is being used, processing advances to a software block 242.

The software in block 242 checks the bot date table (141) and deactivates text relevance bots with creation dates before the current system date and retrieves information from the system settings table (140), the key terms table (170) and the text data table (180). The software in block 242 then initializes text relevance bots to activate with the frequency specified by user (20) in the system settings table (140). Bots are independent components of the application that have specific tasks to perform. In the case of text relevance bots, their tasks are to calculate a relevance measure for each word in the text data table (180) and to identify the type of word (Name, Proper Name, Verb, Adjective, Complement, Determinant or Other). The relevance of each word is determined by calculating a relevance measure using the formula shown in Table 12.

TABLE 12

Relevance (word) = $\sqrt{N} \cdot (nm' - n'm)/\sqrt{(n + n')(n + m)(n' + m')(m + m')}$
where
N = total number of phrases (n + n' + m + m')
n = number of relevant phrases where word appears
n' = number of irrelevant phrases where word appears
m = number of relevant phrases where word does not appear
m' = number of irrelevant phrases where word does not appear Note: relevance is determined by the presence of a keyword in a phrase.

One advantage of this approach is that it takes into account the fact that text is generally a sequence of words and not just a "bag of words". The type of word is determined by using a probabilistic speech tagging algorithm. If the amount of text that needs processing is very large, then a multi layer neural net can be used to sort the text into blocks that should be processed and those that should not. Every text relevance bot contains the information shown in Table 13.

TABLE 13

1. Unique ID number (based on date, hour, minute, second of creation)
2. Creation date (date, hour, minute, second)
3. Mapping information
4. Storage location
5. Organization
6. Organization Layer
7. Word After being activated, the text relevance bots determine the relevance and type of each word with the frequency specified by the user (20) in the system settings table (140). The relevance of each word is stored in the text data table (180) before processing passes to a software block 244.

The software in block 244 checks the bot date table (141) and deactivates text association bots with creation dates before the current system date and retrieves information from the system settings table (140), the tactical layer table (172), the instant impact layer table (173), the mission measure table (175), the text table (180), the element definition table (184) and the factor definition table (185). The software in block 244 then initializes text association bots for the words identified in the prior stage of processing in order of relevance up to the maximum number for each organization (the user (20) specified the maximum number of keywords in the system settings table). Bots are independent components of the application that have specific tasks to perform. In the case of text association bots, their tasks are to determine which element or factor the relevant words are most closely associated with. Every bot initialized by software block 244 will store the association it discovers with the most relevant words stored in the text data table (180). Every text association bot contains the information shown in Table 14.

TABLE 14

1. Unique ID number (based on date, hour, minute, second of creation)
2. Creation date (date, hour, minute, second)
3. Storage location
4. Organization
5. Organization Level
6. Word After being initialized, the bots identify the element or factor that each word is most closely associated with and stores the association "assignment" in the text data table (180) and the element definition table (184) or factor definition table (185) in the ContextBase (60) before processing advances to a software block 245.

The software in block 245 prompts the user (20) via the review data window (703) to review the associations developed in the prior step in processing. Options the user (20) can choose for modifying the associations include: changing the association to another element or factor, removing the assigned association, or adding an association to one or more other elements or factors. When all the user (20) completes the review of the assignments, all changes are stored in the text data table (180), the element definition table (184) and/or the factor definition table (185) before system processing advances to a software block 246.

The software in block 246 checks the system settings table (140) in the Application Database (50) to see if geo-coded data is going to be used in the current analysis. If geo-coded data is not being used, then processing advances to a software block 251. Alternatively, if geo-coded data is being used, then processing advances to a software block 247.

The software in block 247 retrieves the data stored in the geo table (181), converts the data in accordance with applicable geo-coding standard, calculates pre-defined attributes and stores the resulting data in the physical context layer table (171) by element or factor in the ContextBase (60) before processing advances to software block 251.

The software in block 251 checks each of the administrative context layer tables—the physical layer table (171), the tactical layer table (172) and the instant impact layer table (173)—and the social environment layer table (179) in the ContextBase (60) to see if data is missing for any required time period. If data is not missing for any required time period, then processing advances to a software block 256. Alternatively, if data for one or more of the required time periods is missing for one or more of the administrative context layers, then processing advances to a software block 255.

The software in block 255 prompts the user (20) via the review data window (703) to specify the method to be used for filling the blanks for each field that is missing data. Options the user (20) can choose for filling the blanks include: the average value for the item over the entire time period, the average value for the item over a specified period, zero, the average of the preceding item and the following item values and direct user input for each missing item. If the user (20) does not provide input within a specified interval, then the default missing data procedure specified in the system settings table (140) is used. When all the blanks have been filled and stored for all of the missing data, system processing advances to a block 256.

The software in block 256 calculates pre-defined attributes by item for each numeric, item variable in each of the administrative context layer tables—the physical layer table (171), the tactical layer table (172) or the instant impact layer table (173)—in the ContextBase (60) by element. The attributes calculated in this step include: summary data like cumulative total value; ratios like the period to period rate of change in value; trends like the rolling average value, comparisons to a baseline value like change from a prior years level and time lagged values like the time lagged value of each numeric item variable. The software in block 256 also derives attributes for each item date variable in each of the administrative context layer tables (171, 172 and 173) in the ContextBase (60). The derived date variables include summary data like time since last occurrence and cumulative time since first occurrence; and trends like average frequency of occurrence and the rolling average frequency of occurrence. The software in block 256 derives similar attributes for the text and geospatial item variables stored in the administrative context layer tables—the physical layer table (171), the tactical layer table (172) or the instant impact layer table (173)—by element. The numbers derived from the item variables are collectively referred to as "item performance indicators". The software in block 256 also calculates pre-specified combinations of variables called composite variables for measuring the strength of the different elements of performance. The item performance indicators and the composite variables are tagged and stored in the appropriate administrative context layer table—the physical layer table (171), the tactical layer table (172) or the instant impact layer table (173)—by element and organization level before processing advances to a software block 257.

The software in block 257 uses attribute derivation algorithms such as the AQ program to create combinations of variables from the administrative context layer tables—the physical layer table (171), the tactical layer table (172) or the instant impact layer table (173)—that were not pre-specified for combination in the prior processing step. While the AQ program is used in the preferred embodiment of the present invention, other attribute derivation algorithms, such as the LINUS algorithms, may be used to the same effect. The resulting composite variables are tagged and stored in the appropriate administrative context layer table—the physical layer table (171), the tactical layer table (172) or the instant impact layer table (173)—in the ContextBase (60) by element before processing advances to a software block 260.

The software in block 260 derives external factor indicators for each factor numeric data field stored in the social environment layer table (179). For example, external factors can include: the ratio of organization level earnings to expected earnings, the number and amount of jury awards, commodity prices, the inflation rate, growth in gross domestic product, organization level earnings volatility vs. industry average volatility, short and long term interest rates, increases in interest rates, insider trading direction and levels, industry concentration, consumer confidence and the unemployment rate that have an impact on the market price of the equity for an organization level and/or an industry. The external factor indicators derived in this step include: summary data like cumulative totals, ratios like the period to period rate of change, trends like the rolling average value, comparisons to a baseline value like change from a prior years price and time lagged data like time lagged earnings forecasts. In a similar fashion the software in block 260 calculates external factors for each factor date field in the social environment layer table (179) including summary factors like time since last occurrence and cumulative time since first occurrence; and trends like average frequency of occurrence and the rolling average frequency of occurrence. The numbers derived from numeric and date fields are collectively referred to as "factor performance indicators". The software in block 260 also calculates pre-specified combinations of variables called composite factors for measuring the strength of the different external factors. The factor performance indicators and the composite factors are tagged and stored in the social environment layer table (179) by factor and organization level before processing advances to a block 261.

The software in block 261 uses attribute derivation algorithms, such as the Linus algorithm, to create combinations of the external factors that were not pre-specified for combination in the prior processing step. While the Linus algorithm is used in the preferred embodiment of the present invention, other attribute derivation algorithms, such as the AQ program, may be used to the same effect. The resulting composite variables are tagged and stored in the in the social environment layer table (179) by factor and organization level before processing advances to a block 262.

The software in block 262 checks the bot date table (141) and deactivates pattern bots with creation dates before the current system date and retrieves information from the system settings table (140), the physical layer table (171), the tactical layer table (172), the instant impact layer table (173) and the social environment layer table (179).

The software in block 262 then initializes pattern bots for each layer to identify frequent patterns in each layers. Bots are independent components of the application that have specific tasks to perform. In the case of pattern bots, their tasks are to identify and frequent patterns in the data for each context layer, element, factor and organization level. In the preferred embodiment, pattern bots use the Apriori algorithm to identify patterns including frequent patterns, sequential patterns and multi-dimensional patterns. However, a number of other pattern identification algorithms including the PASCAL algorithm can be used alone or in combination to the same effect. Every pattern bot contains the information shown in Table 15.

TABLE 15

1. Unique ID number (based on date, hour, minute, second of creation)
2. Creation date (date, hour, minute, second)
3. Storage location
4. Organization
6. Context Layer, Element, Factor or Organization level
7. Algorithm After being initialized, the bots identify patterns in the data by element, factor, layer or organization level. Each pattern is given a unique identifier and the frequency and type of each pattern is determined. The numeric values associated with the patterns are item performance indicators. The values are stored in the appropriate context layer table by element or factor. When data storage is complete, processing advances to a software block 303.

ContextBase Development

The flow diagrams in FIG. 7A, FIG. 7B, FIG. 7C, FIG. 7D and FIG. 7E detail the processing that is completed by the portion of the application software (300) that continually develops a mission oriented ContextBase (60) by creating and activating analysis bots that:

1. Supplement the organization layer information provided previously by identifying inter-relationships between the different elements of performance, external factors and risks;
2. Complete the mission measure layer of the ContextBase (60) by developing robust models of the elements, factors and risks driving mission measure performance;
3. Optionally, develop robust models of the elements, factors and risks driving action occurrence rates;
4. Optionally, develop robust models of the elements, factors and risks causing instant impact levels to vary, and
5. Combine the mission measure analyses by organization and organization level as required to evaluate strategic alignment and determine the relationship between the mission measures and mission performance.

Each analysis bot generally normalizes the data being analyzed before processing begins. As discussed previously, processing in the preferred embodiment includes an analysis of all mission measures by organization and organization level. It is to be understood that the system of the present invention can combine any number of mission measures as required to evaluate the performance of any organization level.

Processing in this portion of the application begins in software block 301. The software in block 301 checks the mission layer table (175) in the ContextBase (60) to determine if there are current models for all mission measures for every organization level. If all the mission measure models are current, then processing advances to a software block 321. Alternatively, if all mission measure models are not current, then the next mission measure for the next organization level is selected and processing advances to a software block 303. The software in block 303 retrieves the previously calculated values for the mission measure from the mission layer table (175) before processing advances to a software block 304.

The software in block 304 checks the bot date table (141) and deactivates temporal clustering bots with creation dates before the current system date. The software in block 304 then initializes bots in accordance with the frequency specified by the user (20) in the system settings table (140). The bot retrieves information from the mission layer table (175) for the organization level being analyzed and defines regimes for the mission measure being analyzed before saving the resulting cluster information in the mission layer table (175) in the ContextBase (60). Bots are independent components of the application that have specific tasks to perform. In the case of temporal clustering bots, their primary task is to segment mission measure performance into distinct time regimes that share similar characteristics. The temporal clustering bot assigns a unique identification (id) number to each "regime" it identifies before tagging and storing the unique id numbers in the mission layer table (175). Every time period with data are assigned to one of the regimes. The cluster id for each regime is saved in the data record for the mission measure and organization level being analyzed. The time regimes are developed using a competitive regression algorithm that identifies an overall, global model before splitting the data and creating new models for the data in each partition. If the error from the two models is greater than the error from the global model, then there is only one regime in the data. Alternatively, if the two models produce lower error than the global model, then a third model is created. If the error from three models is lower than from two models then a fourth model is added. The process continues until adding a new model does not improve accuracy. Other temporal clustering algorithms may be used to the same effect. Every temporal clustering bot contains the information shown in Table 16.

TABLE 16

1. Unique ID number (based on date, hour, minute, second of creation)
2. Creation date (date, hour, minute, second)
3. Mapping information
4. Storage location
5. Maximum number of clusters
6. Organization
7. Organization Level
8. Mission Measure When bots in block 304 have identified and stored regime assignments for all time periods with mission measure data for the organization being analyzed, processing advances to a software block 305.

The software in block 305 checks the bot date table (141) and deactivates variable clustering bots with creation dates before the current system date. The software in block 305 then initializes bots as required for each element of performance and external factor for the current organization level. The bots activate in accordance with the frequency specified by the user (20) in the system settings table (140), retrieve the information from the physical layer table (171), the tactical layer table (172), the instant impact layer table (173), the social environment layer table (179), the element definition table (184) and/or the factor definition table (185) as required and define segments for the element data and factor data before tagging and saving the resulting cluster information in the element definition table (184) or the factor definition table (185).

Bots are independent components of the application that have specific tasks to perform. In the case of variable clustering bots, their primary task is to segment the element data and factor data into distinct clusters that share similar characteristics. The clustering bot assigns a unique id number to each "cluster" it identifies, tags and stores the unique id numbers in the element definition table (184) and factor definition table (185). Every item variable for every element of performance is assigned to one of the unique clusters. The cluster id for each variable is saved in the data record for each variable in the table where it resides. In a similar fashion, every factor variable for every external factor is assigned to a unique cluster. The cluster id for each variable is tagged and saved in the data record for the factor variable. The element data and factor data are segmented into a number of clusters less than or equal to the maximum specified by the user (20) in the system settings table (140). The data are segmented using the "default" clustering algorithm the user (20) specified in the system settings table (140). The system of the present invention provides the user (20) with the choice of several clustering algorithms including: an unsupervised "Kohonen" neural network, decision tree, support vector method, K-nearest neighbor, expectation maximization (EM) and the segmental K-means algorithm. For algorithms that normally require the number of clusters to be specified, the bot will use the maximum number of clusters specified by the user (20). Every variable clustering bot contains the information shown in Table 17.

TABLE 17

1. Unique ID number (based on date, hour, minute, second of creation)
2. Creation date (date, hour, minute, second)
3. Mapping information
4. Storage location
5. Element of performance or external factor
6. Clustering algorithm type
7. Organization
8. Organization Level
9. Maximum number of clusters
10. Mission Measure
11. Variable 1
. . . to
11 + n. Variable n When bots in block 305 have identified, tagged and stored cluster assignments for the data associated with each element of performance or external factor in the element definition table (184) or factor definition table (185), processing advances to a software block 306.

The software in block 306 checks the mission layer table (175) in the ContextBase (60) to see if the current mission measure is an options based measure like contingent liabilities, real options or strategic risk. If the current mission measure is not an options based measure, then processing advances to a software block 309. Alternatively, if the current mission measure is an options based measure, then processing advances to a software block 307.

The software in block 307 checks the bot date table (141) and deactivates options simulation bots with creation dates before the current system date. The software in block 307 then retrieves the information from the system settings table (140), the element definition table (184) and factor definition table (185) and the scenarios table (152) as required to initialize option simulation bots in accordance with the frequency specified by the user (20) in the system settings table (140).

Bots are independent components of the application that have specific tasks to perform. In the case of option simulation bots, their primary task is to determine the impact of each element and factor on an option mission measure under different scenarios. The option simulation bots run a normal scenario, an extreme scenario and a combined scenario. In this embodiment, Monte Carlo models are used to complete the probabilistic simulation, however other probabilistic simulation models such as Quasi Monte Carlo can be used to the same effect. The element and factor impacts on option mission measures could be determined using the processed detailed below for the other types of mission measures, however, in this embodiment a separate procedure is used. The models are initialized specifications used in the baseline calculations. Every option simulation bot activated in this block contains the information shown in Table 18.

TABLE 18

1. Unique ID number (based on date, hour, minute, second of creation)
2. Creation date (date, hour, minute, second)
3. Mapping information
4. Storage location
5. Type: normal, extreme or combined
6. Option type: real option, contingent liability or strategic risk
7. Organization
7. Organization level
8. Mission measure After the option simulation bots are initialized, they activate in accordance with the frequency specified by the user (20) in the system settings table (140). Once activated, the bots retrieve the required information and simulate the mission measure over the time periods specified by the user (20) in the system settings table (140) as required to determine the impact of each element and factor on the mission measure. After the option simulation bots complete their calculations, the resulting sensitivities are saved in the element definition table (184) and factor definition table (185) by organization and organization level in the application database (50) and processing advances to a software block 309.

The software in block 309 checks the bot date table (141) and deactivates all predictive model bots with creation dates before the current system date. The software in block 309 then retrieves the information from the system settings table (140), the mission layer table (175), the element definition table (184) and the factor definition table (185) as required to initialize predictive model bots for each mission layer.

Bots are independent components of the application that have specific tasks to perform. In the case of predictive model bots, their primary task is to determine the relationship between the element and factor data and the mission measure being evaluated. Predictive model bots are initialized for every organization level where the mission measure being evaluated is used. They are also initialized for each cluster and regime of data in accordance with the cluster and regime assignments specified by the bots in blocks 304 and 305 by organization and organization level. A series of predictive model bots is initialized at this stage because it is impossible to know in advance which predictive model type will produce the "best" predictive model for the data from each organization level. The series for each model includes 12 predictive model bot types: neural network; CART; GARCH, projection pursuit regression; generalized additive model (GAM), redundant regression network; rough-set analysis, boosted Naive Bayes Regression; MARS; linear regression; support vector method and stepwise regression. Additional predictive model types can be used to the same effect. Every predictive model bot contains the information shown in Table 19.

TABLE 19

1. Unique ID number (based on date, hour, minute, second of creation)
2. Creation date (date, hour, minute, second)
3. Mapping information
4. Storage location
5. Organization
6. Organization level
7. Mission measure
8. Global or Cluster (ID) and/or Regime (ID)
9. Element, sub-element or external factor
10. Predictive model type After predictive model bots are initialized, the bots activate in accordance with the frequency specified by the user (20) in the system settings table (140). Once activated, the bots retrieve the required data from the appropriate table in the ContextBase (60) and randomly partition the element or factor data into a training set and a test set. The software in block 309 uses "bootstrapping" where the different training data sets are created by re-sampling with replacement from the original training set so data records may occur more than once. After the predictive model bots complete their training and testing, the best fit predictive model assessments of element and factor impacts on mission measure performance are saved in the element definition table (184) and the factor definition table (185) before processing advances to a block 310.

The software in block 310 determines if clustering improved the accuracy of the predictive models generated by the bots in software block 309 by organization and organization level. The software in block 310 uses a variable selection algorithm such as stepwise regression (other types of variable selection algorithms can be used) to combine the results from the predictive model bot analyses for each type of analysis—with and without clustering—to determine the best set of variables for each type of analysis. The type of analysis having the smallest amount of error as measured by applying the mean squared error algorithm to the test data are given preference in determining the best set of variables for use in later analysis. There are four possible outcomes from this analysis as shown in Table 20.

TABLE 20

| | |
|---|---|
| 1. | Best model has no clustering |
| 2. | Best model has temporal clustering, no variable clustering |
| 3. | Best model has variable clustering, no temporal clustering |
| 4. | Best model has temporal clustering and variable clustering |

If the software in block 310 determines that clustering improves the accuracy of the predictive models for an organization level, then processing advances to a software block 314. Alternatively, if clustering does not improve the overall accuracy of the predictive models for an organization level, then processing advances to a software block 312.

The software in block 312 uses a variable selection algorithm such as stepwise regression (other types of variable selection algorithms can be used) to combine the results from the predictive model bot analyses for each model to determine the best set of variables for each model. The models having the smallest amount of error, as measured by applying the mean squared error algorithm to the test data, are given preference in determining the best set of variables. As a result of this processing, the best set of variables contain the: item variables, item performance indicators, factor performance indications, composite variables and composite factors (aka element data and factor data) that correlate most strongly with changes in the mission measure being analyzed. The best set of variables will hereinafter be referred to as the "performance drivers".

Eliminating low correlation factors from the initial configuration of the vector creation algorithms increases the efficiency of the next stage of system processing. Other error algorithms alone or in combination may be substituted for the mean squared error algorithm. After the best set of variables have been selected, tagged and stored in the element definition table (184) and the factor definition table (185) for each organization level, the software in block 312 tests the independence of the performance drivers for each organization level before processing advances to a block 313.

The software in block 313 checks the bot date table (141) and deactivates causal predictive model bots with creation dates before the current system date. The software in block 313 then retrieves the information from the system settings table (140) and the element definition table (184) and factor definition table (185) as required to initialize causal predictive model bots for each element of performance, sub-element of performance and external factor in accordance with the frequency specified by the user (20) in the system settings table (140).

Bots are independent components of the application that have specific tasks to perform. In the case of causal predictive model bots, their primary task is to refine the performance driver selection to reflect only causal variables. The Bayesian bots in this step also refine the estimates of element or factor impact developed by the predictive model bots in a prior processing step by assigning a probability to the impact estimate. A series of causal predictive model bots are initialized at this stage because it is impossible to know in advance which causal predictive model will produce the "best" vector for the best fit variables from each model. The series for each model includes five causal predictive model bot types: Tetrad, MML, LaGrange, Bayesian and path analysis. The software in block 313 generates this series of causal predictive model bots for each set of performance drivers stored in the element definition table (184) and factor definition table (185) in the previous stage in processing. Every causal predictive model bot activated in this block contains the information shown in Table 21.

TABLE 21

1. Unique ID number (based on date, hour, minute, second of creation)
2. Creation date (date, hour, minute, second)
3. Mapping information
4. Storage location
5. Element, sub-element or external factor
6. Variable set
7. Causal predictive model type
8. Mission measure
9. Organization
10. Organization level After the causal predictive model bots are initialized by the software in block 313, the bots activate in accordance with the frequency specified by the user (20) in the system settings table (140). Once activated, they retrieve the required information for each model and sub-divide the variables into two sets, one for training and one for testing. After the causal predictive model bots complete their processing for each model, the software in block 313 uses a model selection algorithm to identify the model that best fits the data for each element of performance, sub-element of performance and external factor being analyzed. For the system of the present invention, a cross validation algorithm is used for model selection. The software in block 313 tags and saves the refined estimates of probable impact and the best fit causal factors in the element definition table (184) or the factor definition table (185) in the ContextBase (60) before processing advances to a block 321.

If software in block 310 determines that clustering improves predictive model accuracy, then processing advances directly to block 314 as described previously. The software in block 314 uses a variable selection algorithm such as stepwise regression (other types of variable selection algorithms can be used) to combine the results from the predictive model bot analyses for each model, cluster and/or regime to determine the best set of variables for each model. The models having the smallest amount of error as measured by applying the mean squared error algorithm to the test data are given preference in determining the best set of variables. As a result of this processing, the best set of variables contains: the element data and factor data that correlate most strongly with changes in the components of value. The best set of variables will hereinafter be referred to as the "performance drivers". Eliminating low correlation factors from the initial configuration of the vector creation algorithms increases the efficiency of the next stage of system processing. Other error algorithms alone or in combination may be substituted for the mean squared error algorithm. After the best set of variables have been selected, tagged as performance drivers and stored in the element definition table (184) and factor definition table (185) for all organization levels, the software in block 314 tests the independence of the performance drivers at every organization level before processing advances to a block 315.

The software in block 315 checks the bot date table (141) and deactivates causal predictive model bots with creation dates before the current system date. The software in block 315 then retrieves the information from the system settings table (140) and the element definition table (184) and factor definition table (185) as required to initialize causal predictive model bots for each element of performance, sub-element of performance and external factor for every organization level in accordance with the frequency specified by the user (20) in the system settings table (140).

Bots are independent components of the application that have specific tasks to perform. In the case of causal predictive model bots, their primary task is to refine the element and factor performance driver selection to reflect only causal variables. (Note: these variables are grouped together to represent a single element vector when they are dependent). In some cases it may be possible to skip the correlation step before selecting causal the item variables, factor variables, item performance indicators, factor performance indicators, composite variables and composite factors (aka element data and factor data). A series of causal predictive model bots are initialized at this stage because it is impossible to know in advance which causal predictive model will produce the "best" vector for the best fit variables from each model. The series for each model includes four causal predictive model bot types: Tetrad, LaGrange, Bayesian and path analysis. The Bayesian bots in this step also refine the estimates of element or factor impact developed by the predictive model bots in a prior processing step by assigning a probability to the impact estimate. The software in block 315 generates this series of causal predictive model bots for each set of performance drivers stored in the element definition table (184) and factor definition table (185) in the previous stage in processing. Every causal predictive model bot activated in this block contains the information shown in Table 22.

TABLE 22

1. Unique ID number (based on date, hour, minute, second of creation)
2. Creation date (date, hour, minute, second)
3. Mapping information
4. Storage location
5. Mission measure
6. Cluster (ID) and/or Regime (ID)
7. Element, sub-element or external factor
8. Variable set
9. Organization
10. Organization level
11. Causal predictive model type After the causal predictive model bots are initialized by the software in block 315, the bots activate in accordance with the frequency specified by the user (20) in the system settings table (140). Once activated, they retrieve the required information for each model and sub-divide the variables into two sets, one for training and one for testing. The same set of training data are used by each of the different types of bots for each model. After the causal predictive model bots complete their processing for each model, the software in block 315 uses a model selection algorithm to identify the model that best fits the data for each element, sub-element or external factor being analyzed by model and/or regime by organization and organization level. For the system of the present invention, a cross validation algorithm is used for model selection. The software in block 315 saves the refined impact estimates and the best fit causal factors in the element definition table (184) or the factor definition table (185) in the ContextBase (60) before processing advances to a block 321.

The software in block 321 tests the performance drivers to see if there is interaction between elements, between elements and external factors or between external factors by organization and organization level. The software in this block identifies interaction by evaluating a chosen model based on stochastic-driven pairs of value-driver subsets. If the accuracy of such a model is higher that the accuracy of statistically combined models trained on attribute subsets, then the attributes from subsets are considered to be interacting and then they form an interacting set. The software in block 321 also tests the performance drivers to see if there are "missing" performance drivers that are influencing the results. If the software in block 321 does not detect any performance driver interaction or missing variables for each organization level, then system processing advances to a block 324. Alternatively, if missing data or performance driver interactions across elements are detected by the software in block 321 for one or more mission measure processing advances to a software block 322.

The software in block 322 prompts the user (20) via the structure revision window (706) to adjust the specification(s) for the elements of performance, sub-elements of performance or external factors as required to minimize or eliminate the interaction that was identified. At this point the user (20) has the option of specifying that one or more elements of performance, sub elements of performance and/or external factors be combined for analysis purposes (element combinations and/or factor combinations) for each organization level where there is interaction between elements and/or factors. The user (20) also has the option of specifying that the elements or external factors that are interacting will be evaluated by summing the impact of their individual performance drivers. Finally, the user (20) can choose to re-assign a performance driver to a new element of performance or external factor to eliminate the inter-dependency. This process is the preferred solution when the inter-dependent performance driver is included in the going concern element of performance. Elements and external factors that will be evaluated by summing their performance drivers will not have vectors generated.

Elements of performance and external factors generally do not share performance drivers and they are not combined with one another. However, when an external factor and an element of performance are shown to be inter-dependent, it is usually because the element of performance is a dependent on the external factor. For example, the performance of a process typically varies with the price of commodities consumed in the process. In that case, the external factor impact and the element of performance would be expected to be a function of the same performance driver. The software in block 322 examines all the factor-element dependencies and suggest the appropriate percentage of factor risk assignment to the different elements it interacts with. For example, 30% of a commodity factor risk could be distributed to each of the 3 processes that consume the commodity with the remaining 10% staying in the going concern element of performance. The user (20) either accepts the suggested distribution or specifies his own distribution for each factor-element interaction. After the input from the user (20) is saved in the system settings table (140), the element definition table (184) and factor definition table (185) system processing advances to a software block 323. The software in block 323 checks the system settings table (140) and the element definition table (184) and factor definition table (185) to see if there any changes in structure. If there have been changes in the structure, then processing returns to block 201 and the system processing described previously is repeated. Alternatively, if there are no changes in structure, then the information regarding the element interaction is saved in the organization layer table (174) before processing advances to a block 324.

The software in block 324 checks the bot date table (141) and deactivates vector generation bots with creation dates before the current system date. The software in block 324 then initializes bots for each element of performance, sub-element of performance, element combination, factor combination and external factor for each organization level in the organization. The bots activate in accordance with the frequency specified by the user (20) in the system settings table (140), retrieve the information from the system settings table (140), the element definition table (184) and factor definition table (185) as required to initialize vector generation bots for each element of performance and sub-element of performance in accordance with the frequency specified by the user (20) in the system settings table (140). Bots are independent components of the application that have specific tasks to perform. In the case of vector generation bots, their primary task is to produce formulas, (hereinafter, vectors) that summarize the relationship between the causal performance drivers and changes in the component or sub-component of value being examined for each organization level. The causal performance drivers may be grouped by element of performance, sub-element of performance, external factor, factor combination or element combination. As discussed previously, the vector generation step is skipped for performance drivers where the user has specified that performance driver impacts will be mathematically summed to determine the value of the element or factor. The vector generation bots an induction algorithm to generate the vectors. Other vector generation algorithms can be used to the same effect. The software in block 324 generates a vector generation bot for each set of causal performance drivers stored in the element definition table (184) and factor definition table (185). Every vector generation bot contains the information shown in Table 23.

TABLE 23

1. Unique ID number (based on date, hour, minute, second of creation)
2. Creation date (date, hour, minute, second)
3. Mapping information
4. Storage location
5. Organization
6. Organization level
7. Mission measure
8. Element, sub-element, factor or combination
9. Factor 1
. . . to
9 + n. Factor n When bots in block 324 have identified, tagged and stored vectors for all time periods with data for all the elements, sub-elements, combinations or external factors where vectors are being calculated in the element definition table (184) and factor definition table (185) by organization and organization level, processing advances to a software block 325.

The software in block 325 checks the bot date table (141) and deactivates element life bots with creation dates before the current system date. The software in block 325 then retrieves the information from the system settings table (140) and the element definition table (184) as required to initialize element life bots for each element and sub-element of performance for each organization level being analyzed.

Bots are independent components of the application that have specific tasks to perform. In the case of element life bots, their primary task is to determine the expected life of each element and sub-element of performance. There are three methods for evaluating the expected life of the elements and sub-elements of performance:

1. Elements of performance that are defined by a population of members or items (such as: channel partners, customers, employees and vendors) will have their lives estimated by analyzing and forecasting the lives of the members of the population. The forecasting of member lives will be determined by the "best" fit solution from competing life estimation methods including the Iowa type survivor curves, Weibull distribution survivor curves, Gompertz-Makeham survivor curves, polynomial equations using a tournament;
2. Elements of performance (such as patents, long term supply agreements and insurance contracts) that have legally defined lives will have their lives calculated using the time period between the current date and the expiration date of the element or sub-element; and
3. Finally, for commercial business evaluations elements of performance and sub-elements of performance (such as brand names, information technology and processes) that do not have defined lives and/or that may not consist of a collection of members will have their lives estimated as a function of the organization level Competitive Advantage Period (CAP).

In the latter case, the estimate will be completed using the element vector trends and the stability of relative element strength. More specifically, lives for these element types are estimated by: subtracting time from the CAP for element volatility that exceeds organization volatility and/or subtracting time for relative element strength that is below the leading position and/or relative element strength that is declining. In all cases, the resulting values are tagged and stored in the element definition table (184) for each element and sub-element of performance by organization and organization level. Every element life bot contains the information shown in Table 24.

TABLE 24

1. Unique ID number (based on date, hour, minute, second of creation)
2. Creation date (date, hour, minute, second)
3. Mapping information
4. Storage location
5. Organization
6. Organization Level
7. Mission measure
8. Element or sub-element of performance
9. Life estimation method (item analysis, date calculation or relative to CAP)

After the element life bots are initialized, they are activated in accordance with the frequency specified by the user (20) in the system settings table (140). After being activated, the bots retrieve information for each element and sub-element of performance from the element definition table (184) as required to complete the estimate of element life. The resulting values are then tagged and stored in the element definition table (184) by organization and organization level in the ContextBase (60) before processing advances to a block 326.

The software in block 326 checks the bot date table (141) and deactivates event risk bots with creation dates before the current system date. The software in the block then retrieves the information from the system settings table (140) and the event risk table (186) as required to initialize event risk bots for each organization level in accordance with the frequency specified by the user (20) in the system settings table (140). Bots are independent components of the application that have specific tasks to perform. In the case of event risk bots, their primary tasks are to forecast the frequency of standard event risks by organization and organization level and forecast the impact on the mission measure. In addition to forecasting risks that are traditionally covered by insurance, the system of the present invention also uses the data to forecast standard, "non-insured" event risks such as the risk of employee resignation and the risk of customer defection. The system of the present invention uses a tournament of forecasting methods for standard event risk forecasting. Other forecasting methods can be used to the same effect. Every event risk bot contains the information shown in Table 25.

TABLE 25

1. Unique ID number (based on date, hour, minute, second of creation)
2. Creation date (date, hour, minute, second)
3. Mapping information
4. Storage location
5. Organization
6. Organization level
7. Mission measure
8. Event risk After the event risk bots are initialized, the bots activate in accordance with the frequency specified by the user (20) in the system settings table (140). After being activated the bots, retrieve the data from the element definition table (184) and factor definition table (185) and then forecast the frequency and severity of the event risks. The resulting forecasts for each organization level are then stored in the event risk table (186) before processing advances to a software block 327.

The software in block 327 checks the bot date table (141) and deactivates extreme value bots with creation dates before the current system date. The software in block 327 then retrieves the information from the system settings table (140), the element definition table (184), the factor definition table (185) and the event risk table (186) as required to initialize extreme value bots in accordance with the frequency specified by the user (20) in the system settings table (140). Bots are independent components of the application that have specific tasks to perform. In the case of extreme value bots, their primary task is to forecast the probability of realizing extreme values and identify the range of extreme values for every event risk, action and causal performance driver (for both elements of performance and external factors). The extreme value bots use the Blocks method and the peak over threshold method to identify extreme values. Other extreme value algorithms can be used to the same effect. Every extreme value bot activated in this block contains the information shown in Table 26.

TABLE 26

1. Unique ID number (based on date, hour, minute, second of creation)
2. Creation date (date, hour, minute, second)
3. Mapping information TABLE 26-continued 4. Storage location
5. Organization
6. Organization level
7. Mission measure
8. Method: blocks or peak over threshold
9. Event risk, performance driver or action After the extreme value bots are initialized, they activate in accordance with the frequency specified by the user (20) in the system settings table (140). Once activated, they retrieve the required information and forecast the likelihood of realizing extreme values and determine the extreme value range for each performance driver or event risk. The bot tags and saves the extreme values for each causal performance driver in the element definition table (184) or the factor definition table (185) by organization and organization level. The extreme event risk information is stored in the event risk table (186) by organization and organization level in the ContextBase (60) before processing advances to a software block 328.

The software in block 328 checks the bot date table (141) and deactivates strategic event bots with creation dates before the current system date. The software in block 328 then retrieves the information from the system settings table (140), the element definition table (184), the factor definition table (185) and the event risk table (186) as required to initialize strategic event bots in accordance with the frequency specified by the user (20) in the system settings table (140). Bots are independent components of the application that have specific tasks to perform. In the case of strategic event bots, their primary task is to identify the probability and magnitude of strategic events that can impact mission measure performance for each organization level. The strategic event bots use game theoretic real option models to forecast strategic risks. Other risk forecasting algorithms can be used to the same effect. Every strategic event bot activated in this block contains the information shown in Table 27.

TABLE 27

1. Unique ID number (based on date, hour, minute, second of creation)
2. Creation date (date, hour, minute, second)
3. Mapping information
4. Storage location
5. Mission measure
6. Organization
7. Organization level After the strategic event bots are initialized, they activate in accordance with the frequency specified by the user (20) in the system settings table (140). Once activated, they retrieve the required information and forecast the frequency and magnitude of strategic events. The bots save the strategic event forecast information in the event risk table (186) by organization and organization level in the ContextBase (60) and processing advances to a block 329.

The software in block 329 checks the bot date table (141) and deactivates statistical bots with creation dates before the current system date. The software in block 329 then retrieves the information from the system settings table (140), the element definition table (184), the factor definition table (185) and the event risk table (186) as required to initialize statistical bots for each causal performance driver and event risk. Bots are independent components of the application that have specific tasks to perform. In the case of statistical bots, their primary tasks are to calculate and store statistics such as mean, median, standard deviation, slope, average period change, maximum period change, variance and covariance between each causal performance driver and event risk. Every statistical bot contains the information shown in Table 28.

TABLE 28

1. Unique ID number (based on date, hour, minute, second of creation)
2. Creation date (date, hour, minute, second)
3. Mapping information
4. Storage location
5. Organization
6. Organization level
7. Mission measure
8. Performance driver or event risk The bots in block 329 calculate and store statistics for each causal performance driver and event risk in the element definition table (184), factor definition table (185) or event risk table (186) by organization and organization level. The covariance information is also stored in the organization layer table (174) before processing advances to a software block 331.

The software in block 331 checks the bot date table (141) and deactivates forecast update bots with creation dates before the current system date. The software in block 331 then retrieves the information from the system settings table (140) and factor definition table (185) as required to initialize forecast bots in accordance with the frequency specified by the user (20) in the system settings table (140). Bots are independent components of the application that have specific tasks to perform. In the case of forecast update bots, their task is to compare the forecasts for external factors and with the information available from futures exchanges and update the existing forecasts as required. Every forecast update bot activated in this block contains the information shown in Table 29.

TABLE 29

1. Unique ID number (based on date, hour, minute, second of creation)
2. Creation date (date, hour, minute, second)
3. Mapping information
4. Storage location
5. Organization
6. Organization level
7. External factor
8. Forecast time period After the forecast update bots are initialized, they activate in accordance with the frequency specified by the user (20) in the system settings table (140). Once activated, they retrieve the required information and determine if any forecasts need to be updated to bring them in line with the market data on future values. The bots save the updated factor forecasts in the factor definition table (185) by organization and organization level and processing advances to a software block 334.

The software in block 334 checks the bot date table (141) and deactivates scenario bots with creation dates before the current system date. The software in block 334 then retrieves the information from the system settings table (140), the element definition table (184), the factor definition table (185) and the event risk table as required to initialize scenario bots in accordance with the frequency specified by the user (20) in the system settings table (140).

Bots are independent components of the application that have specific tasks to perform. In the case of scenario bots, their primary task is to identify likely scenarios for the evolution of the causal performance drivers and event risks by organization and organization level. The scenario bots use information from the element definition table (184), the factor definition table (185) and the event risk table (186) to develop forecasts for the evolution of causal performance drivers and risks under normal conditions, extreme conditions and a blended extreme-normal scenario. Every scenario bot activated in this block contains the information shown in Table 30.

TABLE 30

1. Unique ID number (based on date, hour, minute, second of creation)
2. Creation date (date, hour, minute, second)
3. Mapping information
4. Storage location
5. Type: normal, extreme or blended
6. Organization
7. Organization level
8. Mission measure After the scenario bots are initialized, they activate in accordance with the frequency specified by the user (20) in the system settings table (140). Once activated, they retrieve the required information and develop a variety of scenarios as described previously. After the scenario bots complete their calculations, they save the resulting scenarios in the scenario table (187) by organization and organization level in the ContextBase (60) and processing advances to a block 341.

The software in block 341 checks the system settings table (140) in the application database (50) to see if knowledge is going to be captured from a subject matter expert. If the current calculations are not going to utilize knowledge from a subject matter expert (25), then processing advances to a software block 344. Alternatively, if the current calculations are going to utilize knowledge captured from a subject matter expert (25), then processing advances to a software block 342.

The software in block 342 will guide the subject matter expert (25) through a series of steps as required to capture knowledge via the knowledge capture window (707). The subject matter expert (25) will provide knowledge by selecting from a template of pre-defined elements, events, actions and organization structure graphics that are developed from the information stored in the ContextBase (60). The subject-matter expert (25) is first asked to define what type of knowledge will be provided. The choices will include each of the six context layers as well as element definition, factor definition, event risk definition and scenarios. On this same screen, the subject-matter expert (25) will also be asked to decide whether basic structures or probabilistic structures will provided in this session, if this session will require the use of a time-line and if the session will include the lower level subject matter. The selection regarding type of structures will determine what type of samples will be displayed on the next screen. If the use of a time-line is indicated, then the user will be prompted to: select a reference point—examples would include today, event occurrence, when I started, etc.; define the scale being used to separate different times—examples would include seconds, minutes, days, years, etc.; and specify the number of time slices being specified in this session. The selection regarding which type of knowledge will be provided determines the display for the last selection made on this screen. As shown in Table 31 there is a natural hierarchy to the different types of knowledge that can be provided by subject-matter experts (25). For example, mission level knowledge would be expected in include relationships with the organization, instant impact, tactical and physical context layers. If the subject-matter expert (25) agrees, the knowledge capture window (707) will guide the subject-matter expert (25) to provide knowledge for each of the "lower level" knowledge areas by following the natural hierarchies shown in Table 31.

TABLE 31

| Starting point | "Lower level" knowledge areas |
| --- | --- |
| Mission | Organization, Instant Impact, Tactical, Physical |
| Organization | Instant Impact, Tactical, Physical |
| Instant Impact | Tactical, Physical |

Summarizing the preceding discussion, the subject-matter expert (25) has used the first screen to select one of ten types of knowledge to be provided (mission, organization, instant impact, tactical, physical, social environment, element, factor, event risk or scenario). The subject-matter expert (25) has also chosen to provide this information in one of four formats: basic structure without timeline, basic structure with timeline, relational structure without timeline or relational structure with timeline. Finally, the subject-matter expert (25) has indicated whether or not the session will include an extension to capture "lower level" knowledge. Each selection made by the subject-matter expert (25) will be used to identify the combination of elements, events, actions and organization structure chosen for display and possible selection. This information will be displayed in a manner that is very similar to the manner in which stencils are made available to Visio® users for use in the workspace.

The next screen displayed by the knowledge capture window (707) will, of course, depend on which combination of knowledge, structure and timeline types the subject-matter expert (25) has selected. In addition to displaying the sample structures and elements to the subject-matter expert (25), this screen will also provide the subject-matter expert (25) with the option to use graphical operations to change the relationship structures, define new relationships and define new elements. The thesaurus table (142) in the application database provides graphical operators for: adding an element or factor, consuming an element, acquiring an element, changing element or factor values, adding a relationship, changing the strength of a relationship, identifying an event cycle, identifying a random relationship, identifying commitments, identifying constraints and indicating preferences.

The subject-matter expert (25) would be expected to select the organization structure that most closely resembles the knowledge that is being communicated and add it to the workspace in the knowledge capture window (707). After adding it to the workspace, the subject-matter expert (25) will then edit elements and events and add elements, events and descriptive information as required to fully describe the knowledge being captured from the perspective represented by the screen. If relational information is being specified, then the knowledge capture window (707) will give the subject-matter expert (25) the option of using graphs, numbers or letter grades to communicate the information regarding probabilities. If a timeline is being used, then the next screen displayed by the knowledge capture window (707) will be the screen for the same perspective from the next time period in the time line. The starting point for the next period knowledge capture will be the final version of the knowledge captured in the prior time period. After completing the knowledge capture for each time period for a given level, the knowledge capture window (707) will guide the subject-matter expert (25) to the "lower level" areas where the process will be repeated using samples that are appropriate to the context layer or area being reviewed. At all steps in the process, the subject matter background information in the ContextBase (60) and the knowledge collected during the session will be used to predict elements, actions, events and organization structures that are likely to be added or modified in the workspace. These "predictions" will be displayed using flashing symbols in the workspace. The subject-matter expert (25) will also be provided with the option of turning the predictive prompting feature off. After knowledge has been captured for all knowledge areas, the graphical results will be converted to data base entries and stored in the appropriate tables (171, 172, 173, 174, 175, 179, 184, 185, 186 or 187) in the ContextBase (60) before processing advances to a software block 344. Data from simulation programs could be added to the ContextBase (60) to provide similar information.

The software in block 344 checks the bot date table (141) and deactivates segmentation bots with creation dates before the current system date. The software in the block then retrieves the information from the system settings table (140), the element definition table (184) and factor definition table (185) and scenario table (187) to initialize segmentation bots for each organization level in accordance with the frequency specified by the user (20) in the system settings table (140). Bots are independent components of the application that have specific tasks to perform. In the case of segmentation bots, their primary task is to use the historical and forecast data to segment the performance contribution of each element, factor, combination and performance driver into a base value and a variability or risk component. The system of the present invention uses wavelet algorithms to segment the performance contribution into two components although other segmentation algorithms such as GARCH could be used to the same effect. Every segmentation bot contains the information shown in Table 32.

TABLE 32

1. Unique ID number (based on date, hour, minute, second of creation)
2. Creation date (date, hour, minute, second)
3. Mapping information
4. Storage location
5. Organization
6. Organization level
7. Mission measure
8. Element, factor, or combination
9. Segmentation algorithm After the segmentation bots are initialized, the bots activate in accordance with the frequency specified by the user (20) in the system settings table (140). After being activated the bots retrieve data from the element definition table (184) and the factor definition table (185) and then segment the performance contribution of each element, factor or combination into two segments. The resulting values by period for each organization level are then stored in the element definition table (184) and factor definition table (185) before processing advances to a software block 345.

The software in block 345 checks the bot date table (141) and deactivates simulation bots with creation dates before the current system date. The software in block 345 then retrieves the information from the system settings table (140), the element definition table (184), the factor definition table (185), the event risk table (186) and the scenario table (187) as required to initialize simulation bots in accordance with the frequency specified by the user (20) in the system settings table (140).

Bots are independent components of the application that have specific tasks to perform. In the case of simulation bots, their primary tasks are to run three different types of simulations for the organization by organization level and to develop an overall summary of the risks to mission measure performance. The simulation bots run probabilistic simulations of mission measure performance for each organization level using: the normal scenario, the extreme scenario and the blended scenario. They also run an unconstrained genetic algorithm simulation that evolves to the most negative value possible over the specified time period. In the preferred embodiment, Monte Carlo models are used to complete the probabilistic simulation, however other probabilistic simulation models such as Quasi Monte Carlo can be used to the same effect. The models are initialized using the statistics and relationships derived from the calculations completed in the prior stages of processing to relate mission measure performance to the performance driver and event risk scenarios. Every simulation bot activated in this block contains the information shown in Table 33.

TABLE 33

1. Unique ID number (based on date, hour, minute, second of creation)
2. Creation date (date, hour, minute, second)
3. Mapping information
4. Storage location
5. Type: normal, extreme, blended or unconstrained genetic algorithm
6. Mission measure
7. Organization
8. Organization level After the simulation bots are initialized, they activate in accordance with the frequency specified by the user (20) in the system settings table (140). Once activated, they retrieve the required information and simulate mission measure performance by organization and organization level over the time periods specified by the user (20) in the system settings table (140). In doing so, the bots will forecast the range of performance and risk that can be expected for the specified mission measure by organization and organization level within the confidence interval defined by the user (20) in the system settings table (140) for each scenario. After the simulation bots complete their calculations, the resulting forecasts are saved in the scenario table (187) by organization and organization level and the risk summary is saved in the mission layer table (175) and the report table (183) in the ContextBase (60) before processing advances to a software block 346.

The software in block 346 checks the bot date table (141) and deactivates mission measure bots with creation dates before the current system date. The software in block 346 then retrieves the information from the system settings table (140), the mission layer table (175), the element definition table (184) and the factor definition table (185) as required to initialize bots for each element of performance, external factor, combination or performance driver for the mission measure being analyzed. Bots are independent components of the application that have specific tasks to perform. In the case of mission measure bots, their task is to determine the contribution of every element of performance, external factor, combination and performance driver to the mission measure being analyzed. The relative contribution of each element, external factor, combination and performance driver is determined by using a series of predictive models to find the best fit relationship between the element of performance vectors, external factor vectors, combination vectors and performance drivers and the mission measure. The system of the present invention uses 12 different types of predictive models to identify the best fit relationship: neural network; CART; projection pursuit regression; generalized additive model (GAM); GARCH; MMDR; redundant regression network; boosted Naïve Bayes Regression; the support vector method; MARS; linear regression; and stepwise regression. The model having the smallest amount of error as measured by applying the mean squared error algorithm to the test data is the best fit model. The "relative contribution algorithm" used for completing the analysis varies with the model that was selected as the "best-fit". For example, if the "best-fit" model is a neural net model, then the portion of the mission measure attributable to each input vector is determined by the formula shown in Table 34.

TABLE 34

$$\left(\sum_{k=1}^{k=m}\sum_{j=1}^{j=n}I_{jk}\times O_k \bigg/ \sum_{j=1}^{j=n}I_{ik}\right) \bigg/ \sum_{k=1}^{k=m}\sum_{j=1}^{j=n}I_{jk}\times O_k$$

Where
$I_{jk}$ = Absolute value of the input weight from input node j to hidden node k
$O_k$ = Absolute value of output weight from hidden node k
M = number of hidden nodes
N = number of input nodes After completing the best fit calculations, the bots review the lives of the elements of performance that impact mission measure performance. If one or more of the elements has an expected life that is shorter than the forecast time period stored in the system settings, then a separate model will be developed to reflect the removal of the impact from the element(s) that are expiring. The resulting values for relative element of performance and external factor contributions to mission measure performance are and saved in the element definition table (184) and the factor definition table (185) by organization level and organization. If the calculations are related to a commercial business then the value of each contribution will be saved. The overall model of mission measure performance is saved in the mission layer table (175) by organization level and organization. Every mission measure bot contains the information shown in Table 35.

TABLE 35

1. Unique ID number (based on date, hour, minute, second of creation)
2. Creation date (date, hour, minute, second)
3. Mapping information
4. Storage location
5. Organization
6. Organization level
7. Element, factor, combination or performance driver
8. Mission Measure After the mission measure bots are initialized by the software in block 346 they activate in accordance with the frequency specified by the user (20) in the system settings table (140). After being activated, the bots retrieve information and complete the analysis of the mission measure performance. As described previously, the resulting relative contribution percentages are saved in the element definition table (184) and the factor definition table (185) by organization level and organization. The overall model of mission measure performance is saved in the mission layer table (175) by organization level and organization before processing advances to a software block 352.

Before continuing the discussion the remaining calculations in this section it is appropriate to briefly review the processing that has been completed in this portion of system (100) processing. At this point, the physical layer table (171), tactical layer table (172) and instant impact layer table (173) contain information that defines the administrative status of the organization by element. The social environment layer table (179) contains information that identifies the external factors that affect mission measure performance. As detailed above, the organization layer table (174) now contains information that identifies the inter-relationship between the different elements, risks and factors that drive mission measure performance. The mission layer table (175) now contains a model that identifies the elements and factors that support mission measure performance by organization level and organization. The mission layer table (175) also contains a summary of the event risks and factor risks that threaten mission measure performance. The event risks include standard event risks, strategic event risks, contingent liabilities and extreme risks while the variability risks include both element variability risks and factor variability risks. In short, the ContextBase (60) now contains a complete picture of the factors that will determine mission measure performance for the organization. In the steps that follow, the ContextBase (60) will be updated to support the analysis of all organization mission measure, organizational alignment will be evaluated, the efficient frontier for organization performance will be defined and the organization ontology will be formalized and stored. The next step in this processing is completed in software block 352.

The software in block 352 checks the mission layer table (175) in the ContextBase (60) to determine if all mission measures for all organizations have current models. If all mission measure models are not current, then processing returns to software block 301 and the processing described above for this portion (300) of the application software. Alternatively, if all mission measure models are current, then processing advances to a software block 354.

The software in block 354 retrieves the previously stored values for mission performance from the mission layer table (175) before processing advances to a software block 355. The software in block 355 checks the bot date table (141) and deactivates measure relevance bots with creation dates before the current system date. The software in block 355 then retrieves the information from the system settings table (140) and the mission layer table (175) as required to initialize a bot for each organization being analyzed. Bots are independent components of the application that have specific tasks to perform. In the case of measure relevance bots, their task is to determine the relevance of each of the different mission measures to mission performance. The relevance of each mission measure is determined by using a series of predictive models to find the best fit relationship between the mission measures and mission performance. The system of the present invention uses 12 different types of predictive models to identify the best fit relationship: neural network; CART; projection pursuit regression; generalized additive model (GAM); GARCH; MMDR; redundant regression network; boosted Naïve Bayes Regression; the support vector method; MARS; linear regression; and stepwise regression. The model having the smallest amount of error as measured by applying the mean squared error algorithm to the test data is the best fit model. Bayes models are used to define the probability associated with each relevance measure and the Viterbi algorithm is used to identify the most likely contribution of all elements, factors and risks by organization level. The relative contribution each of mission measure to mission performance is saved in the mission layer table (175) by organization level and organization. Every measure relevance bot contains the information shown in Table 36.

TABLE 36

1. Unique ID number (based on date, hour, minute, second of creation)
2. Creation date (date, hour, minute, second)
3. Mapping information
4. Storage location
5. Organization
6. Organization level
7. Mission Measure After the measure relevance bots are initialized by the software in block 355 they activate in accordance with the frequency specified by the user (20) in the system settings table (140). After being activated, the bots retrieve information and complete the analysis of the mission performance. As described previously, the relative mission measure contributions to mission performance and the associated probability are saved in the mission layer table (175) by organization level and organization before processing advances to a software block 356.

The software in block 356 retrieves information from the mission measure table (175) and then checks the mission measures by organization level to determine if they are in alignment with the overall mission. As discussed previously, lower level measures that are out of alignment can be identified by the presence of measures from the same level with more impact. For example, employee training could be shown to be a strong performance driver for the organization. If the human resources department (that is responsible for both training and performance evaluations) was using a timely performance evaluation measure, then the measures would be out of alignment. If mission measures are out of alignment, then the software in block 356 prompts the manager (21) via the mission edit data window (708) to change the mission measures by organization level as required to Alternatively, if mission measures by organization level are in alignment, then processing advances to a software block 357.

The software in block 357 checks the bot date table (141) and deactivates frontier bots with creation dates before the current system date. The software in block 357 then retrieves information from the system settings table (140), the element definition table (184), the factor definition table (185), the event risk table (186) and the scenarios table (187) as required to initialize frontier bots for each scenario. Bots are independent components of the application that have specific tasks to perform. In the case of frontier bots, their primary task is to define the efficient frontier for organization performance under each scenario. The top leg of the efficient frontier for each scenario is defined by successively adding the features, options and performance drivers that improve while increasing risk to the optimal mix in resource efficiency order. The bottom leg of the efficient frontier for each scenario is defined by successively adding the features, options and performance drivers that decrease performance while decreasing risk to the optimal mix in resource efficiency order. Every frontier bot contains the information shown in Table 37.

TABLE 37

Figure 10:
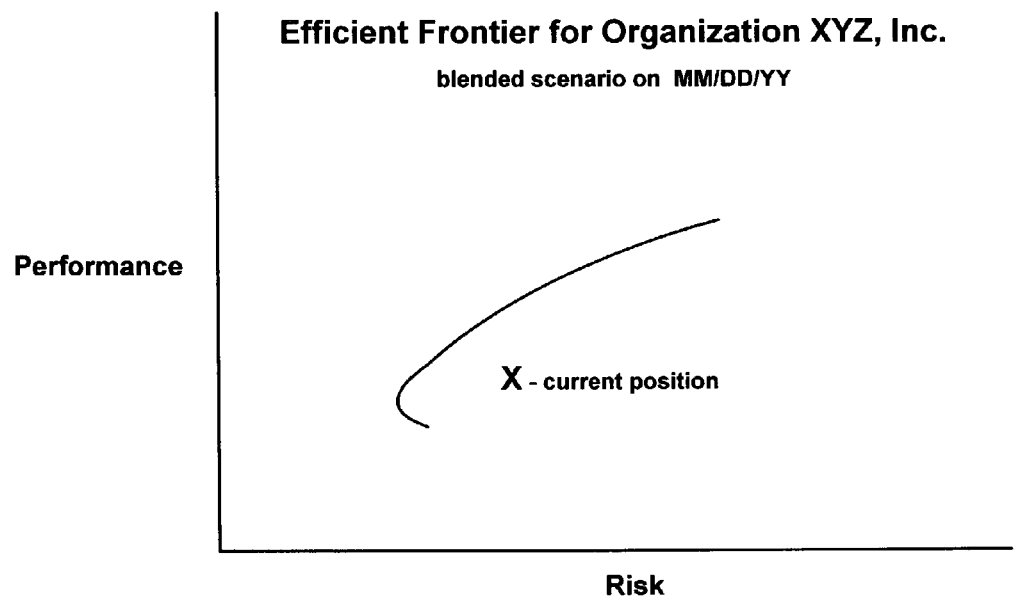
FIG. 10 is a sample report showing the efficient frontier for organization mission measure and the current position of organization XYZ relative to the efficient frontier.
Figure 11:
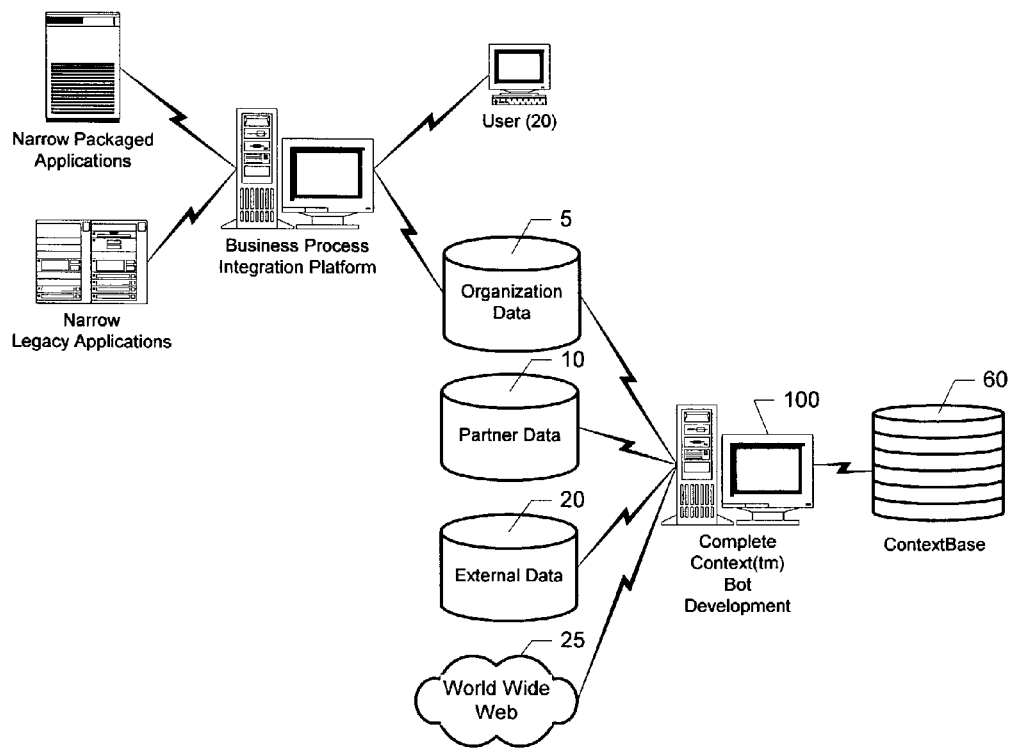
FIG. 11 is a diagram showing how the automated bot development system (100) can be integrated with a business process integration platform.

1. Unique ID number (based on date, hour, minute, second of creation)
2. Creation date (date, hour, minute, second)
3. Mapping information
4. Storage location
5. Organization
6. Mission measure(s)
7. Scenario: normal, extreme and blended After the software in block 357 initializes the frontier bots, they activate in accordance with the frequency specified by the user (20) in the system settings table (140). After completing their calculations, the results of all 3 sets of calculations (normal, extreme and most likely) are saved in the report table (183) in sufficient detail to generate a chart like the one shown in FIG. 10 before processing advances to a software block 358.

The software in block 358 takes the previously stored definitions of key terms, events, organization levels, context layers, event risks and stores them in the ontology table (182) using the OWL language. Use of the rdf based OWL language will enable the synchronization of the organizations ontology with other organizations and will facilitate the extraction and use of information from the semantic web. After the organization ontology is saved in the ContextBase (60), processing advances to a software block 362.

The software in block 362 checks the system settings table (140) in the application database (50) to determine if event models will be created. If event models are not going to be created, then processing advances to a software block 372. Alternatively, if event models are going to be developed, then processing advances to a software block 364. The software in block 364 prompts the user (20) via the event selection window (709) to select the events that will have models developed. Actions are a subset of events so they can also be selected for modeling. The events selected for modeling are stored in the event model table (188) in the ContextBase (60) before processing advances to a software block 365. The software in block 365 retrieves the previously stored event history and forecast information from the tactical layer table (172) before processing advances to a software block 304 where the processing used to identify causal performance drivers is used to identify causal event drivers. When models for each selected event are stored in the event model table (188) processing advances to software block 372.

The software in block 372 checks the system settings table (140) in the application database (50) to determine if impact models will be created. If impact models are not going to be created, then processing advances to a software block 402. Alternatively, if impact models are going to be developed, then processing advances to a software block 374. The software in block 374 prompts the user (20) via the impact selection window (710) to select the impacts that will have models developed. The impacts selected for modeling are stored in the impact model table (189) in the ContextBase (60) before processing advances to a software block 375. The software in block 365 retrieves the previously stored impact history and forecast information from the instant impact layer table (173) before processing advances to a software block 304 where the processing used to identify causal performance drivers is used to identify causal impact drivers. When models for each selected impact are stored in the impact model table (189) processing advances to software block 402.

Simulation and Programming

The flow diagram in FIG. 8 details the processing that is completed by the portion of the application software (400) that: generates context frames for use in simulations of bot performance under a variety of scenarios, develops programming and optionally displays and prints management reports detailing the mission performance of the organization. Processing in this portion of the application starts in software block 402.

The software in block 402 retrieves information defining actions, events and context layers from the key terms table (170) before prompting the user (20) via the bot assignment data window (712) to define an assignment for a Complete Context™ Bot (30). The user is given the option of assigning a bot to: complete an action, complete an event, respond to requests for actions from others, respond to events or obtain information regarding any of the context layers. After the user defines an assignment using the key terms, the assignment specification is stored in the bot assignment table (193) and processing advances to a software block 403.

The software in block 403 prompts the user (20) via the frame definition data window (712) to define a context frame for use in bot simulation and programming. After the user defines a new context frame, the information required to define the frame is retrieved from the physical layer table (171), the tactical layer table (172), the instant impact layer table (173), the organization layer table (174), the mission layer table (175), the social environment layer table (179), the element definition table (184), the factor definition table (185) and/or the event risk table (186) and the context frame specification is stored in the context frame table (190). The context frames developed by the software in block 403 will identify and include information regarding all elements that are impacted by changes in a given context frame. In block 403, the user (20) has the option of limiting the elements included in the frame to include only those elements that have a certain level of impact. For example, if a change in supply chain operation had a very weak causal impact on brand strength, then brand information could be excluded from the frame specified by the user (20) in this block. If event models or impact models have been created, then the software in block 403 can define context frames for event and impact analysis using the same procedure described for developing mission measure context frames. The newly defined context frames for events, impacts and mission measures are stored in the context frame table (190) processing passes to a software block 404.

The software in block 404 combines the bot assignment from block 402 with context frame(s) developed in the prior processing step to define probabilistic simulation models like quasi Monte Carlo of bot performance under a variety of scenarios. The results of the simulations are displayed to the user (20) via the simulation review data window (713). The software in block 404 gives the user (20) the option of modifying the bot assignment or approving the bot assignment already in place. If the user (20) decides to change the bot assignment, then the change in assignment is saved in the bot assignment table (193) and the process described for this software block is repeated before processing advances to a software block 410. Alternatively, if the user (20) does not change the bot assignment, then processing advances directly to software block 410.

The software in block 410 completes two primary functions. First, it combines the bot assignment with results of the simulations to develop the set of program instructions that will maximize bot performance under the forecast scenarios. The bot programming includes the organization ontology and is saved in the bot program table (192). Any number of languages can be used to program the bots including C++, C#, Java and Prolog. Prolog is used in this embodiment as it readily supports the situation calculus analyses used by the bots (30) to evaluate their situation and select the appropriate course of action. As discussed previously and the he Complete Context™ Bots (30) have the ability to interact with bots and organizations that use other ontologies as well as the translation and integration of these ontologies with the ontology developed by the system of the present invention using DQL. The second function completed by the software in block 410 is to use the bot interface data window (714) to communicate with the Complete Context™ Bots (30). The communication with the bots (30) goes in both directions, the bot interface (714) will transfer updated bot programming from the bot program table (192) to the bots (30) and it also accepts data from the bots (30) and stores the completed action data and data collected by the bots in the appropriate table in the ContextBase (60). The software in block 410 receives bot data and updates bot programming upon request. Processing continues to a software block 411.

The software in block 411 prompts the user (20) via the report display and selection data window (714) to review and select reports for printing. The format of the reports is either graphical, numeric or both depending on the type of report the user (20) specified in the system settings table (140). If the user (20) selects any reports for printing, then the information regarding the selected reports is saved in the report table (182). After the user (20) has finished selecting reports, the selected reports are displayed to the user (20) via the report display and selection data window (714). After the user (20) indicates that the review of the reports has been completed, processing advances to a software block 412. The processing can also pass to block 412 if the maximum amount of time to wait for no response specified by the user (20) in the system settings table is exceeded and the user (20) has not responded.

The software in block 412 checks the report table (182) to determine if any reports have been designated for printing. If reports have been designated for printing, then processing advances to a block 415. It should be noted that in addition to standard reports like the efficient frontier shown in FIG. 10, the system can produce reports detailing the information obtained by the bots. The system can also produce reports that compare bot results to plan for actions, impacts and mission measure performance if expected performance levels have been specified and saved in appropriate context layer. The software in block 415 sends the designated reports to the printer (118). After the reports have been sent to the printer (118), processing advances to a software block 417. Alternatively, if no reports were designated for printing, then processing advances directly from block 412 to block 417.

The software in block 417 checks the system settings table (140) to determine if the system is operating in a continuous mode. If the system is operating in a continuous mode, then processing returns to block 205 and the processing described previously is repeated in accordance with the frequency specified by the user (20) in the system settings table (140). Alternatively, if the system is not running in continuous mode, then the processing advances to a block 418 where the system stops.

Thus, the reader will see that the system and method described above transforms data and information from disparate narrow systems into programs that support the development and operation of Complete Context™ Bots (30). The level of detail, breadth and speed of the analysis gives users of the integrated system the ability to create bots in an fashion that is less complex and more effective than any method currently available to users of existing bot development environments. While the focus of the above discussion has been on developing complete context for use developing programming for bots that are used to support organization mission completion and event management, the same method and system can be used to develop bots that will support individuals in achieving the missions they elect to pursue or the events they wish to manage.

While the above description contains many specificities, these should not be construed as limitations on the scope of the invention, but rather as an exemplification of one preferred embodiment thereof. Accordingly, the scope of the invention should be determined not by the embodiment illustrated, but by the appended claims and their legal equivalents.

The invention claimed is:

1. A bot containing instructions for execution in a computer method, the computer method comprising identifying and implementing an organization assignment for a plurality of contexts, wherein a context comprises one or more context layers, wherein a context layer is selected from the group consisting of physical, tactical, instant impact, mission measure, social environment, relationship and combinations thereof.

2. The bot of claim 1 where an organization is an entity with one or more measures or a combination of entities with one or more measures.

3. The bot of claim 2 where entities are selected from the group consisting of individuals, teams, departments, divisions, companies, government agencies, organizations, value chains, multi enterprise organizations and combinations thereof.

4. The bot of claim 2 where measures are selected from the group consisting of: revenue, expense, change in capital, alliance value, brand value, channel value, customer value, customer relationship value, employee value, employee relationship value, human capital value, intellectual property value, investor value, investor relationship value, knowledge value, partner value, partner relationship value, process value, product value, project value, supplier value, supplier relationship value, support chain value, visitor value, workforce value, current operation value, real option value, investment value, derivative value, market sentiment value, market value, factor variability risk, element variability risk, market risk, industry market risk, market volatility, strategic event risk, extreme event risk, event risk, contingent liability and combinations thereof.

5. The bot of claim 1 where an organization assignment is selected from the group consisting of action completion, event completion, response to action requests from others, response to events, data collection and combinations thereof.

6. The bot of claim 1 where a context is defined in an automated fashion by learning from the data.

7. The bot of claim 1 where a context layer can be split into two or more layers.

8. The bot of claim 1 where a relationship context layer defines a plurality of relationships between one or more aspects of organization context and one or more ingredients driving organization performance.

9. The bot of claim 8 where one or more aspects of organization context are selected from the group consisting of physical status, action commitments and short term action plans, short term performance, social environment, long term performance and combinations thereof.

10. The bot of claim 8 where one or more ingredients driving organization performance are selected from the group consisting of elements of performance, resources, risks, external factors and combinations thereof.

11. The bot of claim 10 where an element of performance is selected from the group consisting of alliances, brands, channels, customers, customer relationships, employees, employee relationships, human capital, intellectual property, investors, investor relationships, knowledge, partners, partner relationships, processes, products, projects suppliers, supplier relationships, support chains, visitors, the workforce and combinations thereof.

12. The bot of claim 10 where a risk is selected from the group consisting of factor variability risks, element variability risks, base market risk, industry market risk, market volatility, strategic event risks, extreme event risks, event risks, contingent liabilities and combinations thereof.

13. The bot of claim 10 where an external factor is selected from the group consisting of numerical indicators of: conditions external to the organization, conditions of the organization compared to external expectations of organization condition, organization performance compared to external expectations of organization performance and combinations thereof.

14. The bot of claim 1 where a context can be defined for a subset of the organization using a context frame.

15. The bot of claim 14 where a context frame further comprises a combination of one or more of ingredients and one or more context layers for one or more organization levels.

16. The bot of claim 1 where the method further comprises implementing an organization assignment for a Plurality of contexts in an optimal manner where an optimal manner is a mode that optimizes one or more measure levels for a defined context.

17. The bot of claim 16 where a relative priority assigned to different measures is established by one or more managers.

18. The bot of claim 1 where a measure further comprises any quantitative measure.

19. The bot of claim 1 where an organization has one or more levels and different organization levels can have different measures.

20. The bot of claim 1 that contains an ontology that summarizes an organization context and supports translation with bots programmed using a different ontology or context.

21. A computer readable medium having sequences of instructions stored therein, which when executed cause the processors in a plurality of computers that have been connected via a network to perform a bot development method, comprising:
obtaining one or more measures, a hierarchy and a plurality of data for an organization;
using said measures, hierarchy and at least a portion of the data to define a context for an organization measure performance by organization layer;
identifying one or more assignments that will support the measure performance for said context by organization layer;
programming bots to implement said assignments in an optimal manner for the defined context; and
deploying said bots.

22. The computer readable medium of claim 21 where the method further comprises simulating the performance of said bots under a plurality of scenarios as part of program development.

23. The computer readable medium of claim 21 that supports the development of bots that will complete assignments that support a subset of the organization.

24. The computer readable medium of claim 21 where assignments are selected from the group consisting of action completion, event completion, response to action requests from others, response to events, data collection, data dissemination and combinations thereof.

25. The computer readable medium of claim 21 where an organization further comprises an entity with one or more measures or a combination of entities with one or more measures.

26. The computer readable medium of claim 25 where an entity is selected from the group consisting of individuals, teams, departments, divisions, companies, government agencies, organizations, value chains, multi enterprise organizations and combinations thereof.

27. The computer readable medium of claim 21 where an optimal manner is a mode that optimizes one or more measure levels for a defined context.

28. The computer readable medium of claim 27 where a relative priority assigned to each of one or more measures is established by a manager.

29. The computer readable medium of claim 21 where a measure further comprises any quantitative measure.

30. The computer readable medium of claim 21 where there are one or more short term measures and one or more long term measures.

31. The computer readable medium of claim 21 where a context layer defines a relationship between one more aspects of organization context and one or more ingredients driving organization performance.

32. The computer readable medium of claim 31 where one or more aspects of organization context are selected from the group consisting of physical status, action commitments, tactical status, short term performance, social environment, long term performance and combinations thereof.

33. The computer readable medium of claim 31 where one or more ingredients driving organization performance are selected from the group consisting of one or more elements of performance, one or more resources, one or more risks, one or more external factors and combinations thereof.

34. The computer readable medium of claim 33 where one or more elements of performance are selected from the group consisting of alliances, brands, channels, customers, customer relationships, employees, employee relationships, human capital, intellectual property, investors, investor relationships, knowledge, partners, partner relationships, processes, products, projects suppliers, supplier relationships, support chains, visitors, the workforce and combinations thereof.

35. The computer readable medium of claim 33 where one or more risks are selected from the group consisting of factor variability risks, element variability risks, base market risk, industry market risk, market volatility, strategic event risks, extreme event risks, event risks, contingent liabilities and combinations thereof.

36. A bot programming system, comprising:
networked computers each with a processor having circuitry to execute instructions; a storage device available to each processor with sequences of instructions stored therein, which when executed cause the processors to:
define a context for an organization measure performance by layer;
identify one or more assignments that will support said organization performance;
program bots to implement said assignments in an optimal manner for the defined organization context.

37. The system of claim 36 where assignments are selected from the group consisting of action completion, event completion, response to action requests from others, response to events, data collection, data dissemination or combinations thereof.

* * * * *